(12) United States Patent
Katsube

(10) Patent No.: US 7,424,734 B2
(45) Date of Patent: Sep. 9, 2008

(54) SERVICE PROVIDING SYSTEM, INFORMATION PROCESSING APPARATUS AND METHOD, RECORDING MEDIUM AND PROGRAM

(75) Inventor: Tomohiro Katsube, Chiba (JP)

(73) Assignee: Sony Corporation, Tokyo (JP)

( * ) Notice: Subject to any disclaimer, the term of this patent is extended or adjusted under 35 U.S.C. 154(b) by 705 days.

(21) Appl. No.: 10/463,122

(22) Filed: Jun. 17, 2003

(65) Prior Publication Data

US 2004/0025056 A1    Feb. 5, 2004

(30) Foreign Application Priority Data

Jun. 17, 2002    (JP) .......................... P2002-175579

(51) Int. Cl.
*G06F 7/58* (2006.01)
*G06F 9/00* (2006.01)
*G06F 7/04* (2006.01)

(52) U.S. Cl. .................. 726/4; 726/7; 726/12; 726/27; 713/169

(58) Field of Classification Search .............. 713/170, 713/182, 161, 168, 189, 169; 726/8, 4, 7, 726/12, 27
See application file for complete search history.

(56) References Cited

U.S. PATENT DOCUMENTS

| | | | | |
|---|---|---|---|---|
| 5,867,495 A | * | 2/1999 | Elliott et al. ................ | 370/352 |
| 6,170,017 B1 | * | 1/2001 | Dias et al. .................... | 709/235 |
| 6,243,816 B1 | | 6/2001 | Fang et al. | |
| 6,587,880 B1 | * | 7/2003 | Saigo et al. ................. | 709/225 |
| 6,925,481 B2 | * | 8/2005 | Singhal et al. .............. | 709/200 |
| 6,944,766 B2 | * | 9/2005 | Hamada ...................... | 713/182 |
| 6,990,684 B2 | * | 1/2006 | Futamura et al. ............. | 726/18 |
| 2002/0010756 A1 | * | 1/2002 | Oku ........................... | 709/217 |
| 2002/0026561 A1 | * | 2/2002 | Park ........................... | 711/137 |
| 2003/0149641 A1 | * | 8/2003 | Kouketsu et al. ............. | 705/27 |

FOREIGN PATENT DOCUMENTS

| | | |
|---|---|---|
| JP | 2001/075921 | 3/2001 |
| JP | 2001/283090 | 10/2001 |
| JP | 2002/049859 | 2/2002 |
| JP | 2002/083190 | 2/2002 |

* cited by examiner

*Primary Examiner*—Nasser Moazzami
*Assistant Examiner*—Mohammad W Reza
(74) *Attorney, Agent, or Firm*—Bell, Boyd & Lloyd LLP

(57) ABSTRACT

Service provision through a network is made available by intuitive operation. A private icon for a utilizing service is displayed in an icon folder. The user can display a content of the service by selecting the private icon by the mouse or the like. Because the private icon is an image representative of a content of the service, the user can select and utilize the service by intuitive operation.

6 Claims, 25 Drawing Sheets

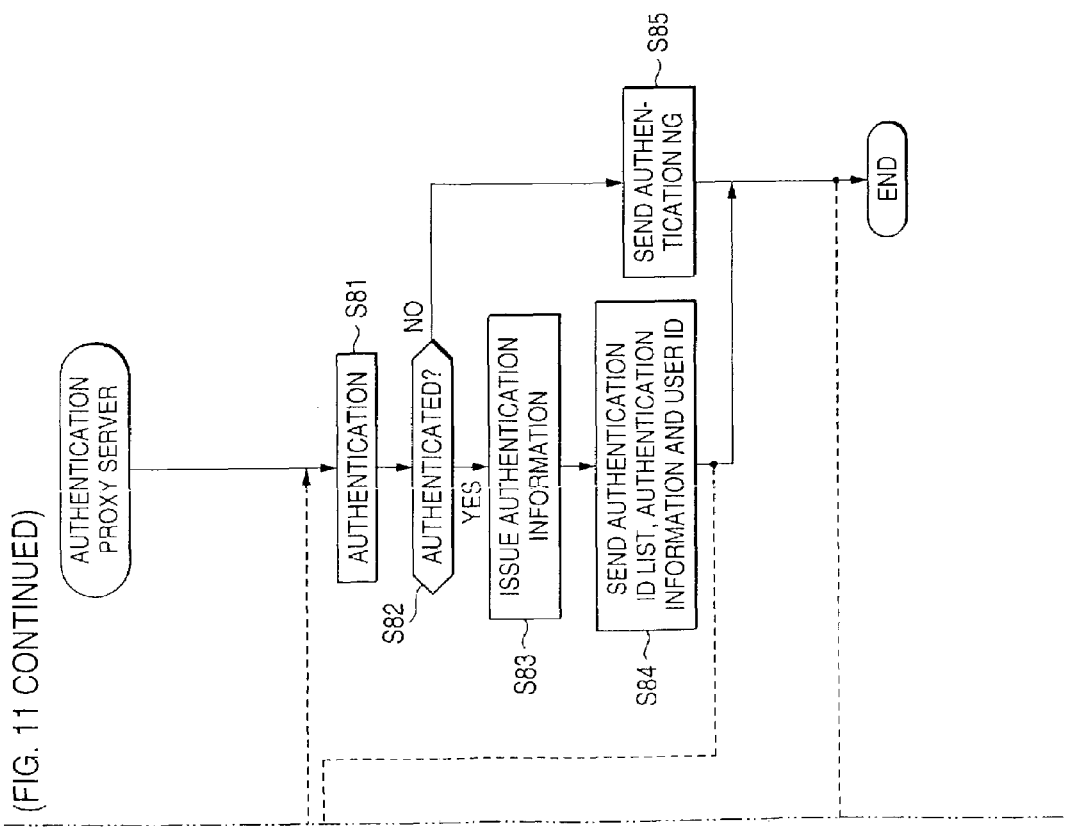

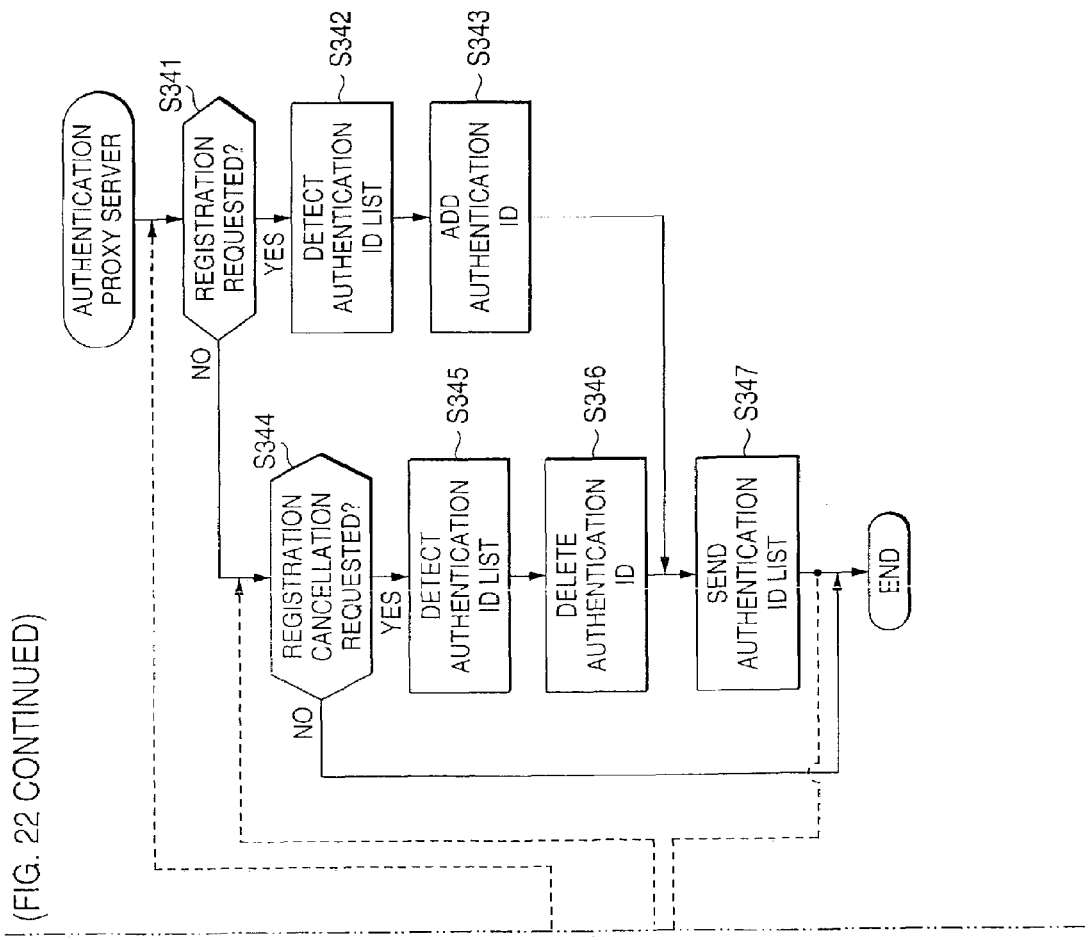

US 7,424,734 B2

SERVICE PROVIDING SYSTEM, INFORMATION PROCESSING APPARATUS AND METHOD, RECORDING MEDIUM AND PROGRAM

BACKGROUND OF THE INVENTION

This invention relates to a service providing system, information processing apparatus and method, recording medium and program, and more particularly to a service providing system, information processing apparatus and method, recording medium and program for a service to be utilized through a network by intuitive operations.

In the case of receiving a service provision from a service server via a network, the user is required to get a user's authentication on the basis of a user's ID, password and the like, from the service server. However, user authentication is independent of each service to be offered. The user is required to input his or her user's ID and password onto the client apparatus each time service provision is changed. This, however, involves problem of taking labor and time.

In this situation, as shown in FIG. 1, there is a proposal on a method to arrange, between a client computer (hereinafter, briefly referred to as "client") 1 and two service servers 3-1, 3-2 (hereinafter, referred merely to as "service server 3" where there is no need of distinction between them, this is true for the other case), an authentication proxy server 2 in order to authenticate the client 1 in the service server 3 (Reverse Proxy Type). The service to be provided to the client 1 is referred to as SSO (Single Sign On) service for the client 1, on condition that authentication is to be made by the authentication proxy server 2. The authentication proxy server 2 manages user's IDs and passwords required for the client 1 who accesses the respective service servers 3-1 and 3-2, besides the user ID and password to authenticate the client 1.

When the client 1 logs in an authentication proxy service by the use of the user ID and password (for authenticating the client 1) granted upon registration to an authentication proxy service to be provided by the authentication proxy server 2, the authentication proxy server 2 authenticates the client 1 on the basis of the user ID and password (authenticates the client 1, in proxy for the service servers 3-1, 3-2).

Then, the authentication proxy server 2 accesses the service server 3-1 or 3-2 depending upon an authentication result on the client 1 by using the user ID and password, granted upon registration to and needed in accessing the service server 3-1, 3-2, and acquires a service as requested by the client 1 from the service server 3-1 or 3-2 and provides it to the client 1. Accordingly, once inputting a predetermined user's ID and password when logging in the authentication proxy service, the user is allowed to receive a service provision from any of the service servers 3-1, 3-2.

Detailing the operation onto the client 1 when receiving a service provision in this manner, the user first inputs his or her user ID and password on an input screen as shown in FIG. 2, thereby logging in the authentication proxy service. Due to this, a list of SSO service for the client 1 is displayed to the client, as shown in FIG. 3. It is noted that, in FIG. 3, there are displayed the names of the service SSO 1 to be provided by the service server 3-1 of FIG. 1 and the service SSO 2 to be provided by the service server 3-2. Then, the user selects a service name (service SSO 1 or SSO 2) on display. Due to this, to the client 1 is displayed a content of the selected service SSO 1 or SSO 2, as shown in FIG. 4 or 5.

However, the operation in this case is by selecting a service name in character expression. This is far from intuitively grasping a content of the selected SSO service. In this manner, in the service providing system having the conventional authentication proxy server 2 to authenticate a client 1 in proxy for the service server 3, there is a drawback, i.e. the user is not allowed to select and use an SSO service through intuitive operations.

It is an object of the present invention to allow the user to intuitively select, for example, an SSO service and utilize the same.

SUMMARY OF THE INVENTION

In a service providing system of the present invention, the authentication managing apparatus includes first storing means for storing service identifying information of the service associated with user identifying information of a user on the terminal unit; determining means for determining whether the terminal unit to be authenticated or not, in proxy for the information providing apparatus; first detecting means for detecting the service identifying information stored associated with the user identifying information from the first storing means when the determining means determines that the terminal unit to be authenticated, in proxy for the information providing apparatus is possible on the terminal unit; first sending means for sending the service identifying information detected by the first detecting means to the image managing means; authenticating means for authenticating the terminal unit when providing the service requested from the terminal unit; and executing means for executing a predetermined process to provide the service to the terminal unit depending upon an authentication result by the authenticating means.

The image managing apparatus includes second storing means for storing service identifying information of the service and image information representative of the service to be identified by the service identifying information; second detecting means for detecting the image information representative of the service to be identified by the service identifying information from the second storing means when the service identifying information is sent by the first sending means of the authentication managing apparatus; and second sending means for sending the image information detected by the second detecting means to the terminal unit.

The terminal unit includes third storing means for storing the image information sent by the second sending means of the image managing means; display control means for displaying an image corresponding to the image information stored in the third storing means; operating means for operating the image displayed by the display control means; request means for requesting to provide the service corresponding to the image operated by the operating means; and receiving means for receiving the service provided due to the process by the executing means of the authentication managing means.

The second storing means of the image managing apparatus stores the service identifying information, the image information representative of the service to be identified by the service identifying information, and accompanying information representative of a managing destination of the service to be identified by the service identifying information; the second detecting means, when the service identifying information is sent by the first sending means of the authentication managing apparatus, detecting from the second storing means the image information representative of the service to be identified by the service identifying information and the accompanying information representative of a managing destination of the service; the second sending means sending the image information and accompanying information detected by the second detecting means to the terminal unit; the third storing means of the terminal unit storing, with association, the image information and accompanying information sent by the second sending means of the image managing apparatus; the request means detecting, from the third storing means, the accompanying information stored associated with the image information representative of the service corresponding to the image operated by the operating means, and sending the detected accompanying information to the authentication managing apparatus thereby requesting to provide the service; the executing means of the authentication managing apparatus acquiring the service being managed in a managing destination shown by the accompanying information sent from the requesting means of the terminal unit depending upon an authentication result by the authenticating means, and executing the process for provision to the terminal unit. The accompanying information can be a URL of the service under management of the information providing apparatus.

The third storage means of the terminal unit can store, with association, the image information sent by the second sending means of the image managing apparatus and accompanying information representative of a managing destination of the service the image information corresponds to; the request means detecting from the third storage means the accompanying information stored associated with the image information representative of the service corresponding to the image operated by the operating means, and sending the accompanying information thus detected to the authentication managing apparatus, thereby requesting to provide the service; and the executing means of the authentication managing means acquiring from the information providing apparatus the service under management at a managing destination represented by the accompanying information sent from the request means of the terminal unit depending upon an authentication result by the authenticating means, and executing the process for provision to the terminal unit.

The determining means of the authentication managing apparatus can determine whether the terminal unit is to be authenticated or not, in proxy for the information providing apparatus, while, when determining that the terminal unit is to be authenticated in proxy for the information providing apparatus, issuing authenticated information representative of that fact; the first sending means sending the service identifying information detected by the first detecting means and the authenticated information issued by the determining means to the image managing apparatus; the authenticating means authenticating the terminal unit on the basis of the authenticated information sent from the terminal unit; the second sending means of the image managing apparatus sending the image information detected by the second detecting means and the authenticated information sent by the first sending means of the authentication managing apparatus to the terminal unit; the third storing means of the terminal unit storing the image information and authenticated information sent by the second sending means of the image managing apparatus; and the request means sending the authenticated information to the authentication managing apparatus, to request for providing the service corresponding to the image operated by the operating means.

A first information processing apparatus of the invention includes storing means for storing service identifying information of the service associated with user identifying information of a user on the terminal unit; determining means for determining whether terminal unit is to be authenticated or not, in proxy for the information providing apparatus; detecting means for detecting the service identifying information stored associated with the user identifying information from the storing means when the determining means determines that the terminal unit is to be authenticated, in proxy for the information providing apparatus; sending means for sending the service identifying information detected by the detecting means such that the image information representative of the service to be identified by the service identifying information stored in the image managing apparatus is provided to the terminal unit; authenticating means for authenticating the terminal unit when providing the service requested from the terminal unit; and executing means for executing a predetermined process to provide the service to the terminal unit depending upon an authentication result by the authenticating means.

The determining means can determine whether the terminal unit is to be authenticated or not, in proxy for the information providing apparatus, while, when determining that the terminal unit is to be authenticated in proxy for the information providing apparatus, issuing authenticated information representative of that fact; the sending means sending the service identifying information detected by the detecting means such that the image information representative of the service to be identified by the service identifying information stored in the image managing apparatus is provided to the terminal unit, and the authenticated information issued by the determining means such that it is sent when the terminal unit requests to provide the service; and the authenticating means, when requesting to provide the service, authenticating the terminal unit on the basis of the authenticated information sent from the terminal unit.

A first information processing method includes a storing step of storing service identifying information of the service associated with user identifying information of a user on the terminal unit; a determining step of determining whether the terminal unit is to be authenticated or not, in proxy for the information providing apparatus; a detecting step of detecting the service identifying information stored associated with the user identifying information when the determining step determines that the terminal unit is to be authenticated in proxy for the information providing apparatus; a sending step of sending the service identifying information detected in the detecting step such that image information representative of the service to be identified by the service identifying information stored in the image managing apparatus is provided to the terminal unit; an authenticating step of authenticating the terminal unit when providing the service is requested from the terminal unit; and an executing step of executing a predetermined process to provide the service to the terminal unit depending upon an authentication result by the authenticating means.

A first recording medium program of the invention includes a storing control step of controlling to store service identifying information of the service associated with user identifying information of a user on the terminal unit; a determining control step of controlling to determine whether the terminal unit is to be authenticated or not, in proxy for the information providing apparatus; a detecting control step of controlling to detect the service identifying information stored associated with the user identifying information when the determining control step determines that the terminal unit is to be authenticated in proxy for the information providing apparatus; a sending control step of controlling to send the service identifying information detected in the detecting control step such that image information representative of the service to be identified by the service identifying information stored in the image managing apparatus is provided to the terminal unit; an authenticating control step of controlling to authenticate the terminal unit when providing the service requested from the terminal unit; and an executing control step of controlling to execute a predetermined process to provide the service to the terminal unit depending upon an authentication result by the authenticating means.

A first program of the invention includes a storing control step of controlling to store service identifying information of the service associated with user identifying information of a user on the terminal unit; a determining control step of controlling to determine whether the terminal unit is to be authenticated or not, in proxy for the information providing apparatus; a detecting control step of controlling to detect the service identifying information stored associated with the user identifying information when the determining control step determines that the terminal unit is to be authenticated in proxy for the information providing apparatus; a sending control step of controlling to send the service identifying information detected in the detecting control step such that image information representative of the service to be identified by the service identifying information stored in the image managing apparatus is provided to the terminal unit; an authenticating control step of controlling to authenticate the terminal unit when providing the service is requested from the terminal unit; and an executing control step of controlling to execute a predetermined process to provide the service to the terminal unit depending upon an authentication result by the authenticating control step.

A first information processing apparatus, method and program includes storing service identifying information of the service associated with user identifying information of a user on the terminal unit; determining whether the terminal unit is to be authenticated or not, in proxy for the information providing apparatus; detecting the service identifying information stored associated with the user identifying information from the storing means when the determining means determines that authentication in proxy for the information providing apparatus is possible on the terminal unit; sending the service identifying information detected in the detecting step such that image information representative of the service to be identified by the service identifying information stored in the image managing apparatus is provided to the terminal unit; authenticating the terminal unit when providing the service requested from the terminal unit; executing a predetermined process to provide the service to the terminal unit depending upon an authentication result by the authenticating means.

A second information processing apparatus of the invention includes storing means for storing service identifying information of the service and image information representative of the service to be identified by the service identifying information; detecting means for detecting, from the storing means, the image information representative of the service to be identified by the service identifying information when the service identifying information is sent from the authentication managing apparatus; and sending means for sending the image information detected by the detecting means to the terminal unit.

The storing means stores the service identifying information, the image information representative of the service to be identified by the service identifying information, and accompanying information representative of a managing destination of the service to be identified by the service identifying information; the detecting means detecting from the storing means the image information representative of the service to be identified by the service identifying information and the accompanying information representative of a managing destination of the service when the service identifying information is sent from the authentication managing apparatus; and the sending means, when an image corresponding to the image information is operated on the terminal unit, sending the image information and accompanying information detected by the detecting means to the authentication managing apparatus, to request for providing the service corresponding to the image operated.

A second information processing method includes a storing step of storing service identifying information of the service and image information representative of the service to be identified by the service identifying information; a detecting step of detecting the image information representative of the service to be identified by the service identifying information when the service identifying information is sent from the authentication managing apparatus; and a sending step of sending the image information detected in the detecting step to the terminal unit.

A second recording medium program includes a storing control step of controlling to store service identifying information of the service and image information representative of the service to be identified by the service identifying information; a detecting control step of controlling to detect the image information representative of the service to be identified by the service identifying information when the service identifying information is sent from the authentication managing apparatus; and a sending control step of controlling to send the image information detected in a process of the detecting step to the terminal unit.

A second program of the invention includes a storing control step of controlling to store service identifying information of the service and image information representative of the service to be identified by the service identifying information; a detecting control step of controlling to detect the image information representative of the service to be identified by the service identifying information when the service identifying information is sent from the authentication managing apparatus; and a sending control step of controlling to send the image information detected by the detecting means to the terminal unit.

A second information processing apparatus, method and program includes storing service identifying information of the service and image information representative of the service to be identified by the service identifying information; detecting, from the storing means, the image information representative of the service to be identified by the service identifying information when the service identifying information is sent from the authentication managing apparatus; sending the image information detected by the detecting means to the terminal unit.

A third information processing method of the invention includes storing means for storing image information sent from an image managing apparatus managing image information representative of the service; display control means for displaying an image corresponding to the image information stored in the storing means; operating means for operating the image being displayed by the display control means; request means for requesting to provide the service corresponding to the image operated by the operating means; and receiving means for receiving the service provided from the information providing apparatus at a request of the request means.

A third information processing method of the invention includes a storing step of storing image information sent from an image managing apparatus managing image information representative of the service; a display control step of displaying an image corresponding to the image information stored in the storing step; an operating step of operating the image being displayed by the display control step; a request step of requesting to provide the service corresponding to the image operated by the operating step; and a receiving step of receiving the service provided from the information providing apparatus at a request in the request step.

A third recording medium program includes a storing control step of controlling to store image information sent from an image managing apparatus managing image information representative of the service; a display control step of controlling to display an image corresponding to the image information stored in the storing control step; an operating control step of controlling to operate the image being displayed by the display control step; a request control step of controlling to request to provide the service corresponding to the image operated by the operating control step; and a receiving control step of controlling to receive the service provided from the information providing apparatus at a request in the request control step.

A third program of the invention includes a storing control step of controlling to store image information sent from an image managing apparatus managing image information representative of the service; a display control step of controlling to display an image corresponding to the image information stored in the storing control step; an operating control step of controlling to operate the image being displayed by the display control step; a request control step of controlling to request to provide the service corresponding to the image operated by the operating control step; and a receiving control step of controlling to receive the service provided from the information providing apparatus at a request in the request control step.

A third information processing apparatus, method and program of the invention includes storing image information sent from an image managing apparatus managing image information representative of the service; displaying an image corresponding to the image information stored in the storing control step; an operating step of operating the image being displayed by the display control step; requesting to provide the service corresponding to the image operated by the operating control step; receiving the service provided from the information providing apparatus at a request in the request control step.

Additional features and advantages of the present invention are described in, and will be apparent from, the following Detailed Description of the Invention and the figures.

DESCRIPTION OF THE PREFERRED EMBODIMENTS

Figure 1:
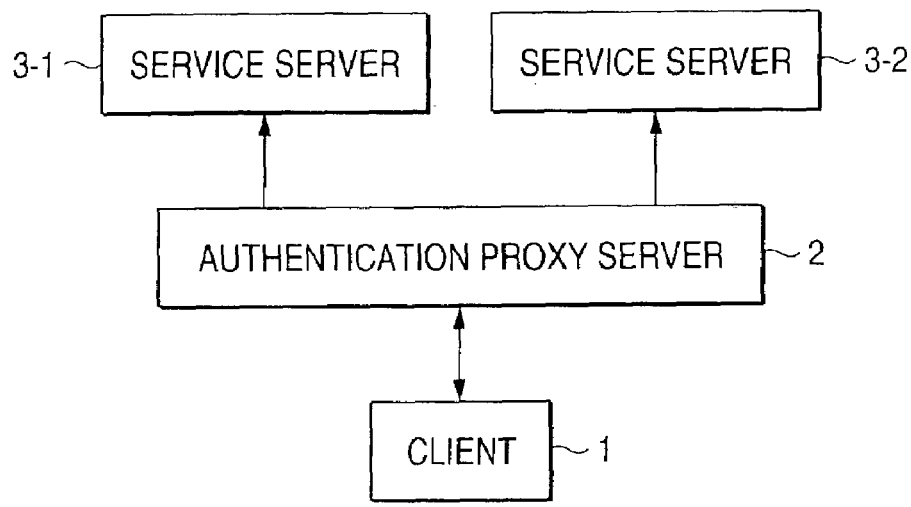
FIG. 1 is a diagram explaining a conventional authentication proxy service.
Figure 2:
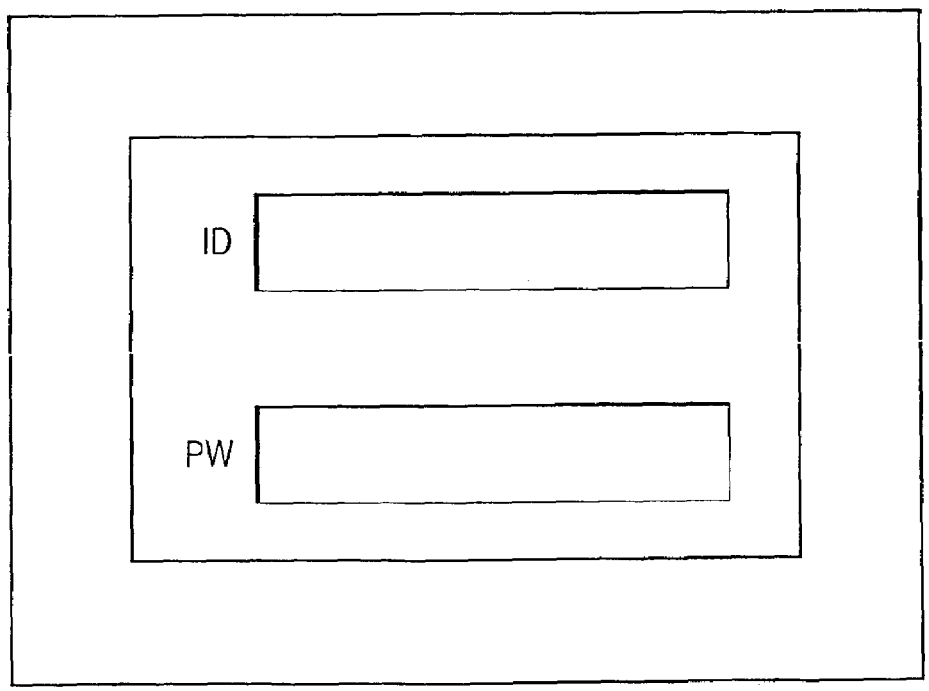
FIG. 2 is a view explaining the operation in the conventional for utilizing an SSO service.
Figure 3:
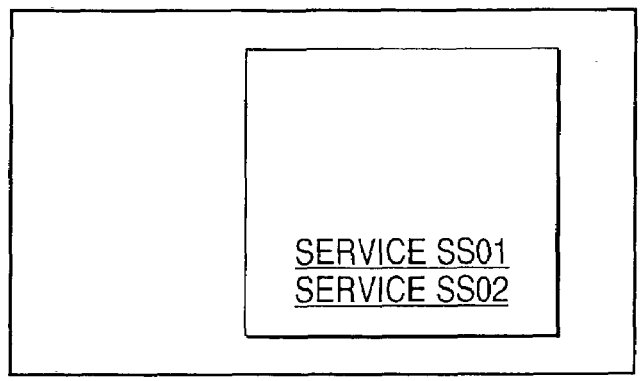
FIG. 3 is another view explaining the operation in the conventional for utilizing an SSO service.
Figure 4:
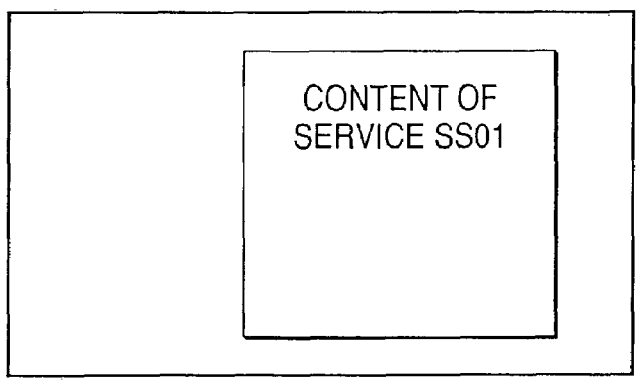
FIG. 4 is another view explaining the operation in the conventional for utilizing an SSO service.
Figure 5:
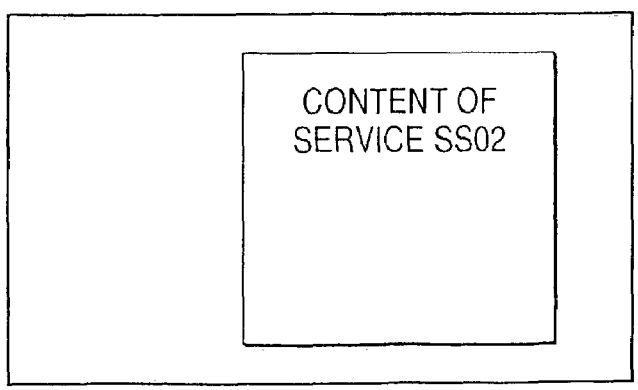
FIG. 5 is another view explaining the operation in the conventional for utilizing an SSO service.
Figure 6:
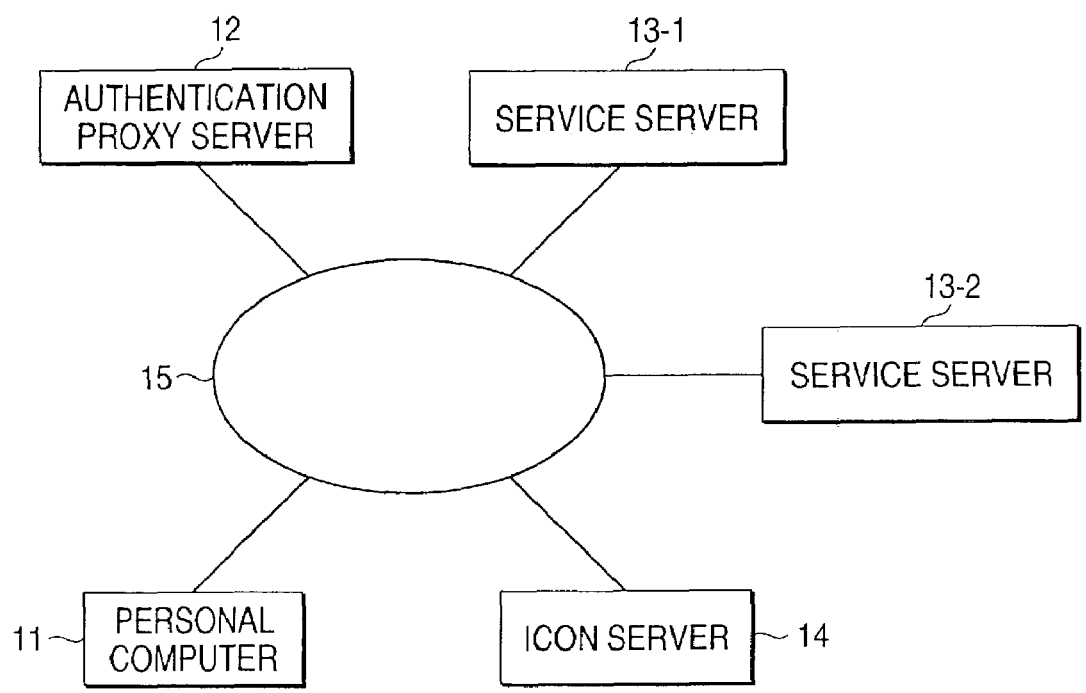
FIG. 6 is diagram showing a configuration example of a service providing system to which the invention is applied.

FIG. 6 shows a configuration example of a service providing system to which the present invention is applied. The network, including the Internet, is connected with those of a personal computer 11 to an icon server 14. An authentication proxy server 12 manages a user ID and password that the personal computer 11 requires for accessing the service servers 13-1, 13-2.

When the personal computer 11, as a client, logs in an authentication proxy service by the use of the user ID and password, inputted by the user, granted upon registration to the authentication proxy service to be offered by the authentication proxy server 12, the authentication proxy server 12 authenticates a client 1 (authenticates the personal computer 11 in proxy for the service server 13-1, 13-2) on the basis of the user ID and password.

Depending upon a result of the authentication on the personal computer 11, the authentication proxy server 12 accesses the service server 13-1 or 13-2 by utilizing the user ID and pass word, held therein, which the personal computer 11 requires for accessing the service server 13-1, 13-2, so that the service requested by the personal computer 11 can be provided onto the personal computer 11.

The icon server 14 allocates a predetermined icon (hereinafter, referred to as "private icon SA") for an SSO service (service to be provided to the personal computer 11 on condition that the personal computer 11 is authenticated by the authentication proxy server 12) (service to be provided by the service server 3-1 or 3-2, in this example). Namely, although to be detailed later, in the invention, an SSO service is to be utilized by the personal computer 11 through the use of a private icon SA allocated by the icon server 14.

Figure 7:
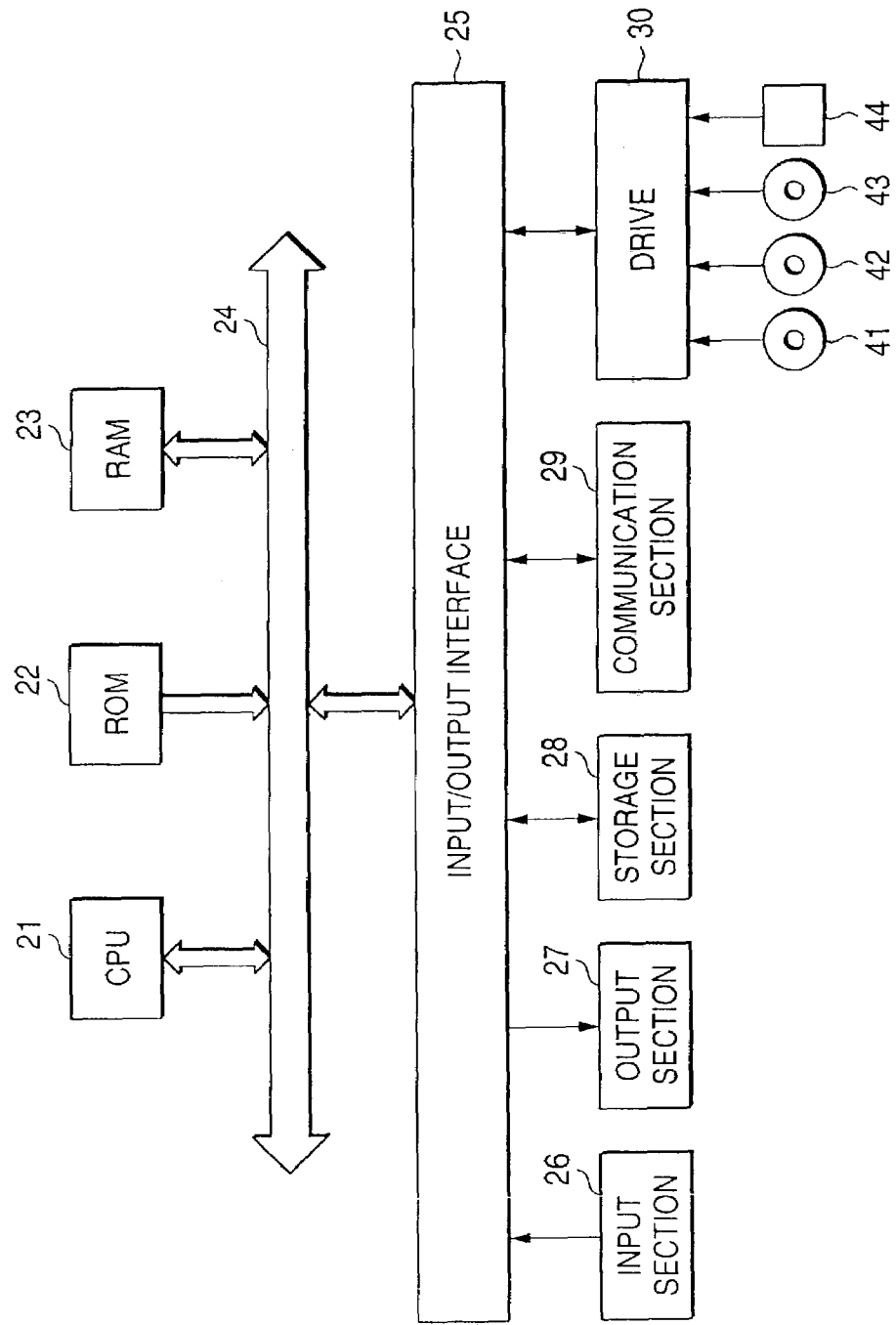
FIG. 7 is a block diagram showing a configuration example of a personal computer of FIG. 6.

FIG. 7 depicts a configuration example of the personal computer 11. A CPU 21 executes various processes according to the program stored in a ROM 22 or the program loaded on the RAM 23 from a storage section 28. The RAM 23 is also stored, appropriately, with the data required for the CPU 21 to execute various processes. The CPU 21, the ROM 22 and the RAM 23 are connected one with another through a bus 24. The bus 24 is also connected with an input/output interface 25.

The input/output interface 25 is connected with an input section 26 of a keyboard, a mouse and the like, an output section 27 of a display, e.g. of a CRT (cathode ray tube) or LCD (liquid crystal display), and a speaker, a storage section 28 configured by a hard disk or the like, and a communicating section 29 configured by a modem, terminal adapter and the like. The communicating section 29 is to process for communications through the network 15.

The input/output interface 25 is connected, as required, with a drive 30, so that a magnetic disk 41, optical disk 42, magnetooptical disk 43 or memory card 44 can be appropriately loaded thereon. The computer program read therefrom is installed to the storage section 28, as required. The configuration of the authentication proxy server 12, service server 13 and icon server 14 is basically similar to the configuration of the personal computer 11, hence being omitted in showing and explanation.

Figure 8:
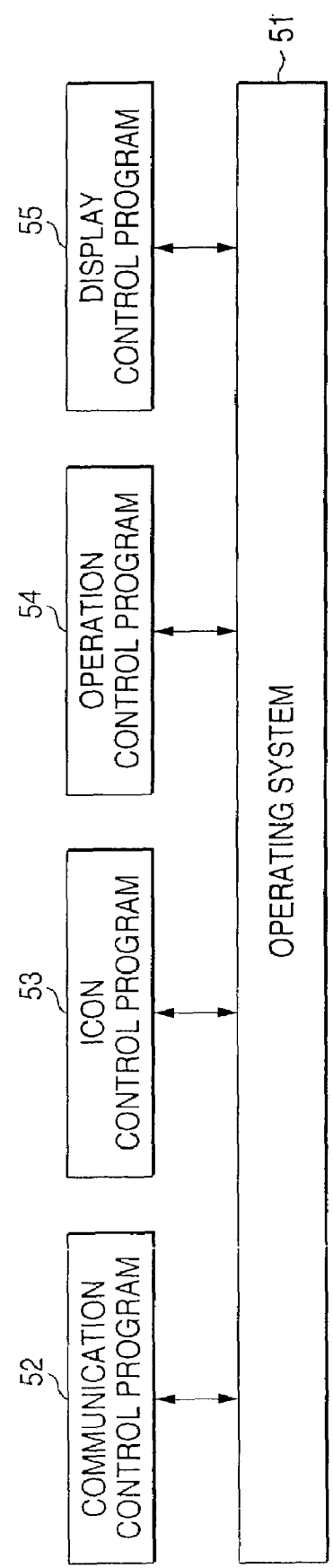
FIG. 8 is a block diagram showing a functional configuration example of a personal computer of FIG. 6.

FIG. 8 shows a configuration example of the programs to be executed by the personal computer 11. An operating system 51 is to control the overall process for the personal computer 11. A communication control program 52 is to control the communications through the network 15. An icon control program 53 is to execute a process responsive to the operation made to the private icon SA displayed on the output section 27. Incidentally, the communication with the icon server 14 is assumably under control by the icon control program 53.

An operation control program 54 is to control an acceptance of an operational input to the input section 26. A display control program 55 is to control the display of the output section 27. Note that, although the FIG. 6 example utilizes the personal computer 11 as a client apparatus, a TV receiver, a game apparatus, a video camera, a refrigerator or the like can be used as a client apparatus provided that the program shown in FIG. 8 is executable on the apparatus.

In order for an SSO service to the personal computer 11, there is a need of registration to the personal computer 11, as referred later. The service, to be registered as an SSO service to the personal computer 11, is required registered in the authentication proxy server 12, as next explained. The service to be registered in the authentication proxy server 12 is, hereinafter, referred to as a subject-of-SSO service in the meaning of a service to be turned into an SSO service.

Figure 9:
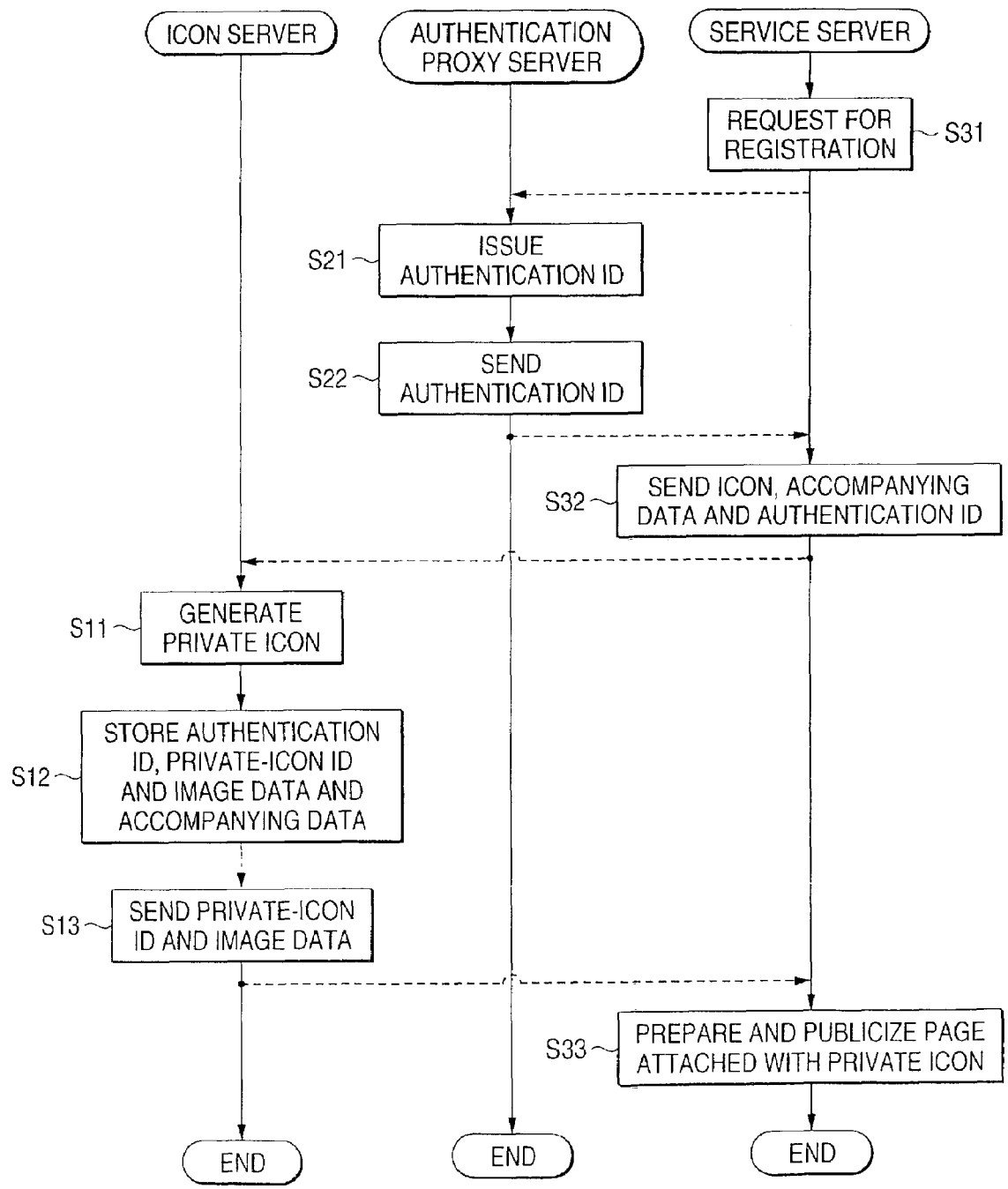
FIG. 9 is a flowchart explaining a registration process for a subject-of-SSO service.
Figure 10:
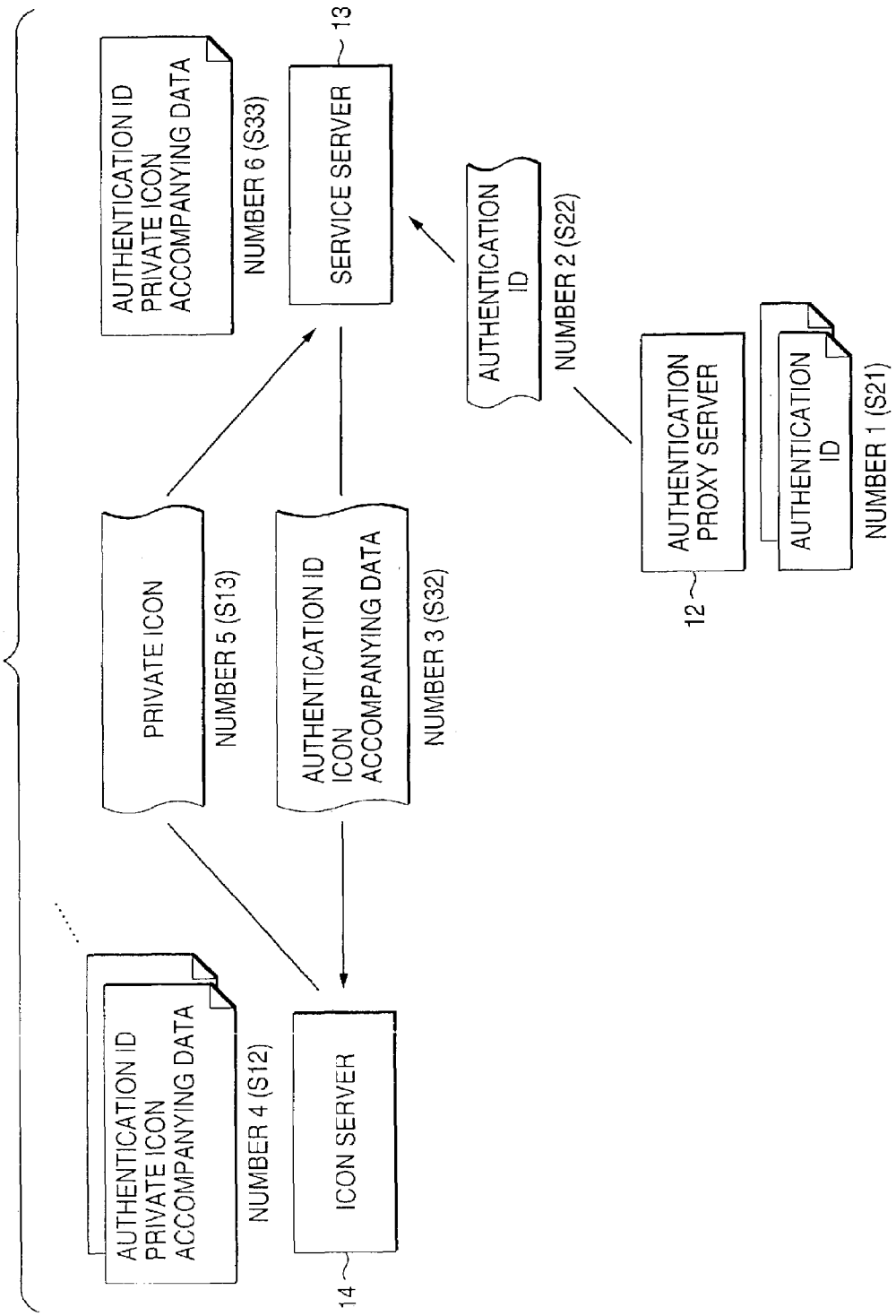
FIG. 10 is a diagram typically showing major pieces of information to be exchanged in the flowchart process of FIG. 9.

FIG. 9 shows a process procedure for registering, to the authentication proxy sever 12, a service to be provided by the service server 13, as a subject-of-SSO service. FIG. 10 typically depicts the major pieces of information to be exchanged according to a flowchart of FIG. 9.

At first, the service server 13 in step S31 makes an application, to the authentication proxy server 12, for registering as a predetermined service as a subject-of-SSO service. The authentication proxy server 12 in step S21 examines a service server 13 making an application for registering as a subject-of-SSO service. Based on a result of the examination, it issues and holds an authentication ID for a service to be registered as a subject-of-SSO service (No. 1 in FIG. 10). Note that, although no authentication ID is possibly issued depending on a certain examination result, herein an authentication ID is assumably issued for explanation sake.

In step S22, the authentication proxy server 12 sends an issued authentication ID and fact of completed registration to the service server 13 (No. 2 in FIG. 10). Receiving the fact of completed registration and authentication ID sent from the authentication proxy server 12, the service server 13 in step S32 sends, to the icon server 14, the authentication ID, icon (e.g. icon of an image data representative of a service content that the user can intuitively grasp the service content) image data corresponding to the service registered as a subject-of-SSO service, and data accompanying the icon (hereinafter, referred to as accompanying data) (No. 3 in FIG. 10). The accompanying data is those of an URL of a service registered as a subject-of-SSO service, a moving-image data file for introducing the service, a music file or text data. Receiving the authentication ID, icon image data and accompanying data thereof (URL, etc.) sent from the service server 13, the icon server 14 in step S11 writes the received icon with information, e.g. URL, of the service server 13, thereby generating a private icon SA.

In step S12, the icon server 14 saves an ID and image data of the generated private icon SA and an authentication ID and accompanying data received in step S11 through placing an association thereof (No. 4 in FIG. 10). In step S13, the icon server 14 sends the private-icon SA ID and image data generated in the step S11 to the service server 13.

Receiving the private-icon SA ID and image data sent from the icon server 14, the service server 13 in Step S33 saves, with association, those and the corresponding accompanying data and authentication ID (No. 6 in FIG. 10), thus opening a homepage for the service, registered as a subject-of-SSO service, to display the private icon SA. The significance of opening the homepage for the service registered as a subject-of-SSO service will be referred later.

Figure 11:
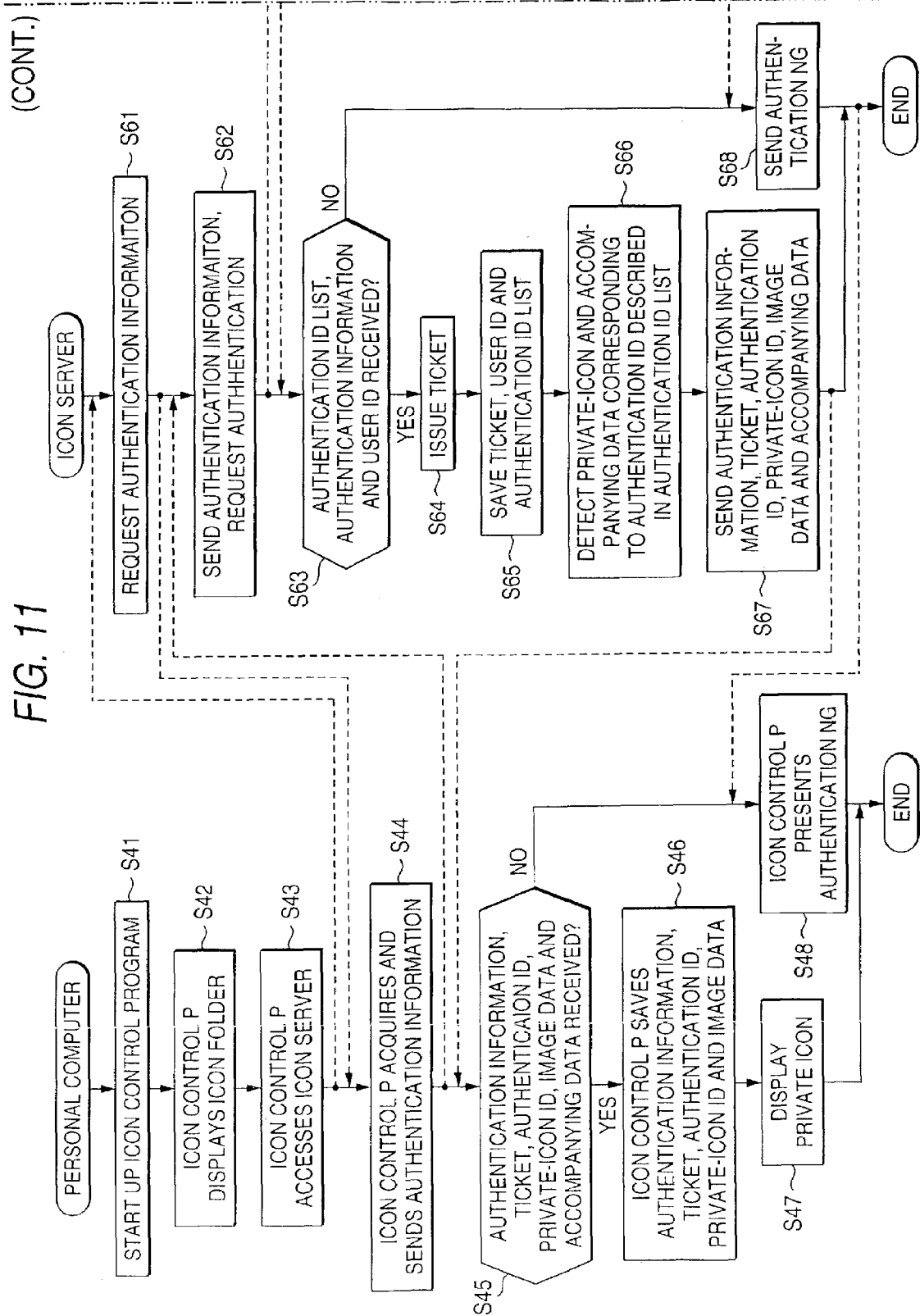
FIG. 11 is a flowchart explaining a process to log in an authentication proxy service.
Figure 12:
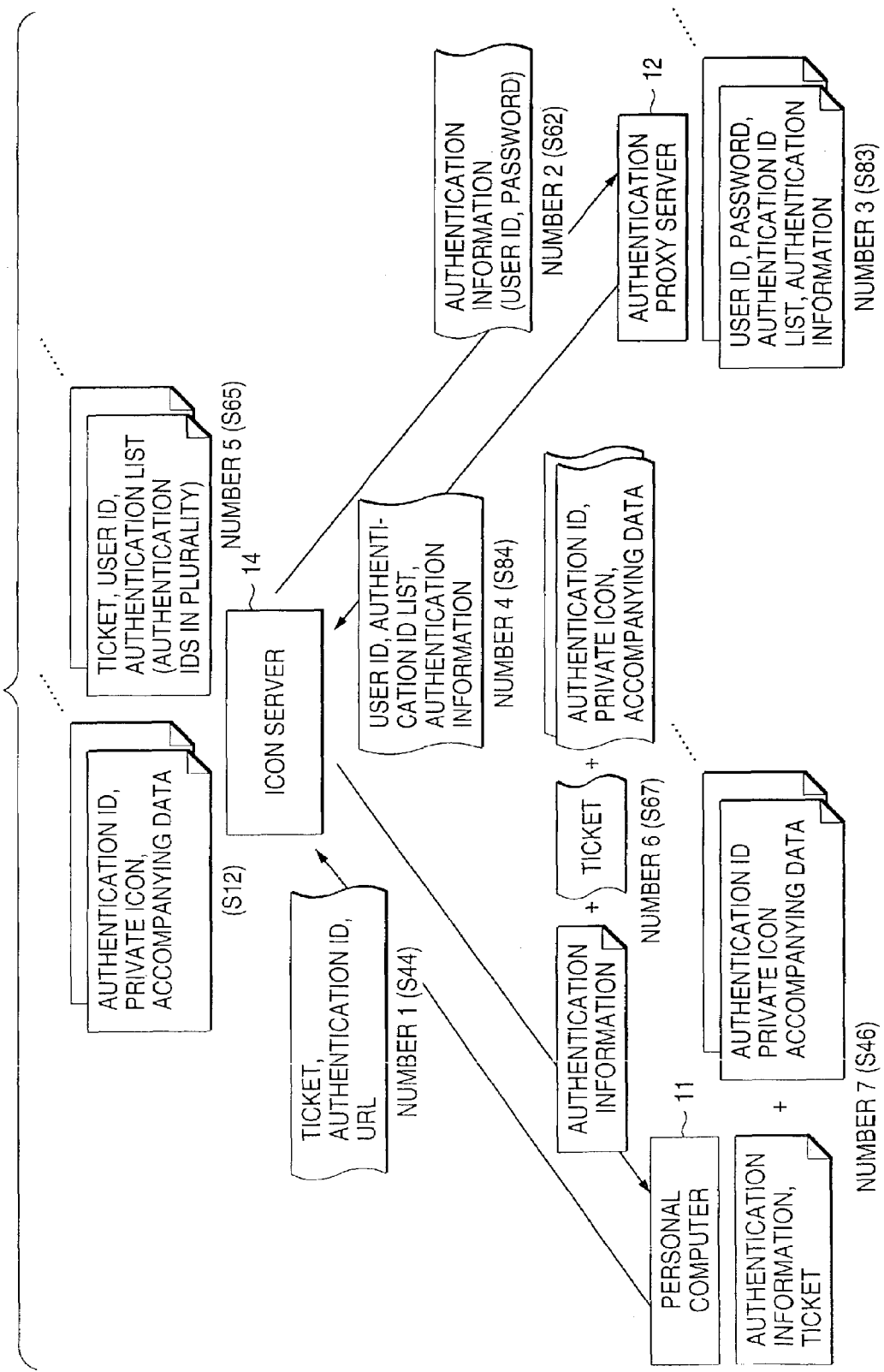
FIG. 12 is a diagram typically showing major pieces of information to be exchanged in the flowchart process of FIG. 11.
Figure 13:
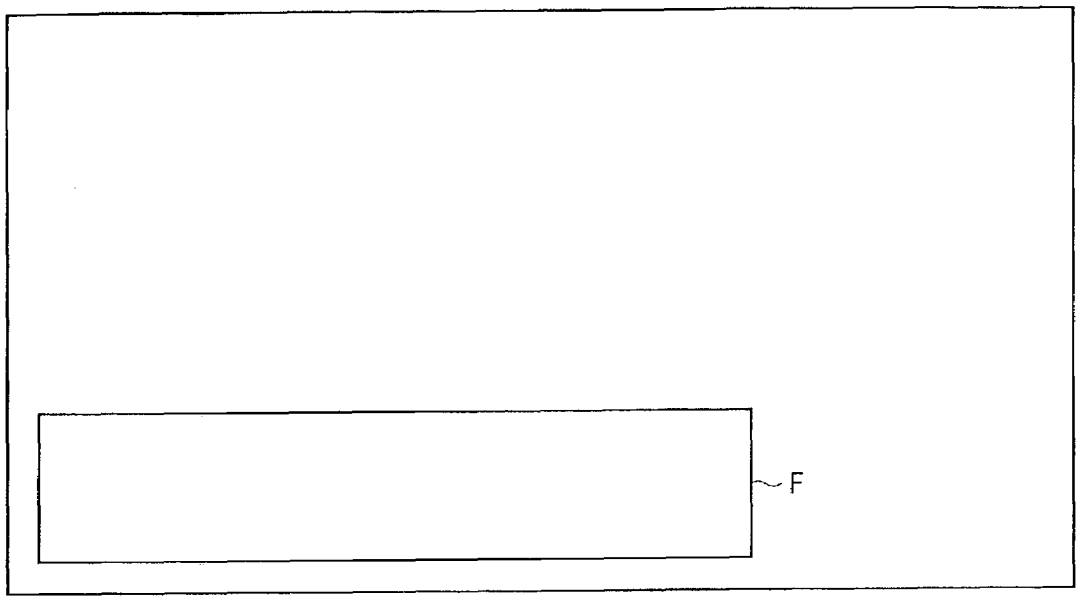
FIG. 13 is a view showing a display example of an icon folder.

Now explanation is made on the process of logging in an authentication proxy service to be provided by the authentication proxy server 12, with reference to a flowchart of FIG. 11. FIG. 12 typically shows the major pieces of information to be exchanged in the process of the flowchart of FIG. 11.

In case the icon control program 53 in step S41 is started up by an operation to the input section 26 of the user's personal computer 11, the icon control program 53 in step S42 controls the display control program 55 to display an icon folder F, displaying a private icon SA as referred later, on the display of the output section 27.

In step S43, the icon control program 53 accesses the icon server 14. The icon server 14 in step S61 requests authenticated information to the personal computer 11. The icon control program 53 of the personal computer 11, in step 44, acquires a user ID and password (the one granted upon registration by the user to the authentication proxy service of the authentication proxy server 12) as authenticated information at the request of the icon server 14, and sends it together with the URL of the authentication proxy server 12 to the icon server 14 (No. 1 in FIG. 12).

Figure 14:
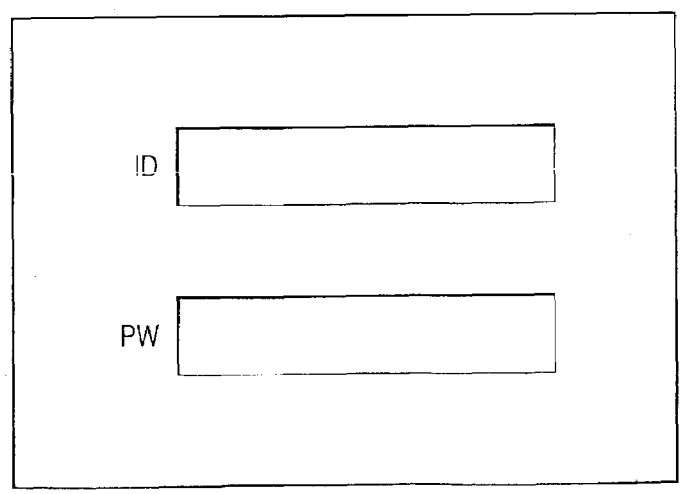
FIG. 14 is a view showing a display example of an input screen.

The icon control program 53, at this time, controls the display control program 55 to display an input screen, having boxes for inputting a user ID and password, on the display of output section 27 as shown in FIG. 14, thereby acquiring a user ID and password inputted to the boxes and sends them to the icon server 14.

The user ID and password may be stored in the storage section 28 or on a memory card 44 so that the icon control program 53 can acquire them from the storage section 28 or memory card 44. Meanwhile, biological information, such as finger print or iris, can be utilized as authenticated information without limited to user ID and password. Furthermore, it is possible to utilize, as authenticated information, apparatus authenticated information unique to the personal computer 11.

The URL of authentication proxy server 12 is assumably stored by the icon control program 53. However, where the icon server 14 manages the URL of authentication proxy server 12, the URL of the authentication proxy server 12 herein is not sent to the icon server 14.

Receiving the user ID and password as well as the URL of the authentication proxy server 12 sent from the personal computer 11 as authenticated information, the icon server 14 in step S62 accesses the authentication proxy server 12 through utilizing the URL and sends the user ID and password to the authentication proxy server 12 (No. 2 in FIG. 12). Receiving the user ID and password as authenticated information sent from the icon server 14, the authentication proxy server 12 in step S81 executes an authentication process to determine, e.g., whether the personal computer 11 (user) is an authorized apparatus (user) registered in the authentication proxy service of the authentication proxy server 12.

The authentication proxy server 12 in step S82 determines whether the personal computer 11 is an authorized apparatus (authorized user) or not, based on the authentication result of the step S81. In the case of a determination as an authorized apparatus (authorized user), the process proceeds to step, S83 wherein the authentication proxy server 12 issues authenticated information representative of an authorized apparatus (authorized user) and stores it together with the user ID received in step S81, the password, ID list and the like managed associated with the user ID (No. 3 in FIG. 12). Then, the authentication proxy server 12 in step S84 sends, to the icon server 14, the authenticated information issued in step S83 and the user ID and authentication ID list stored associated with the authenticated information (No. 4 in FIG. 12).

The icon server 14, in step S63, determines whether the authentication ID list, authenticated information and user ID is received from the authentication proxy server 12 or not. When determined received, the process proceeds to step S64 where the icon server 14 issues a ticket capable of identifying a personal computer 11 (user) (capable of detecting a user ID). Then, the icon server 14 in step S65 saves the user ID and authentication ID list received in step S63 and the ticket issued in the step S64 through placing an association (No. 5 in FIG. 12).

In step S66, the icon server 14 detects a private-icon SA ID and image data saved associated with each authentication ID described in the authentication ID list and its accompanying data (URL, etc.). Because the icon server 14 saved the authentication ID for the service registered as a subject-of-SSO service, the private-icon SA ID and image data and the accompanying data (URL, etc.) in step S12 of FIG. 9 (No. 4 in FIG. 10), it can detect, from an authentication ID described in the authentication list, a private-icon SA ID and image data associated therewith and its accompanying data.

Figure 15:
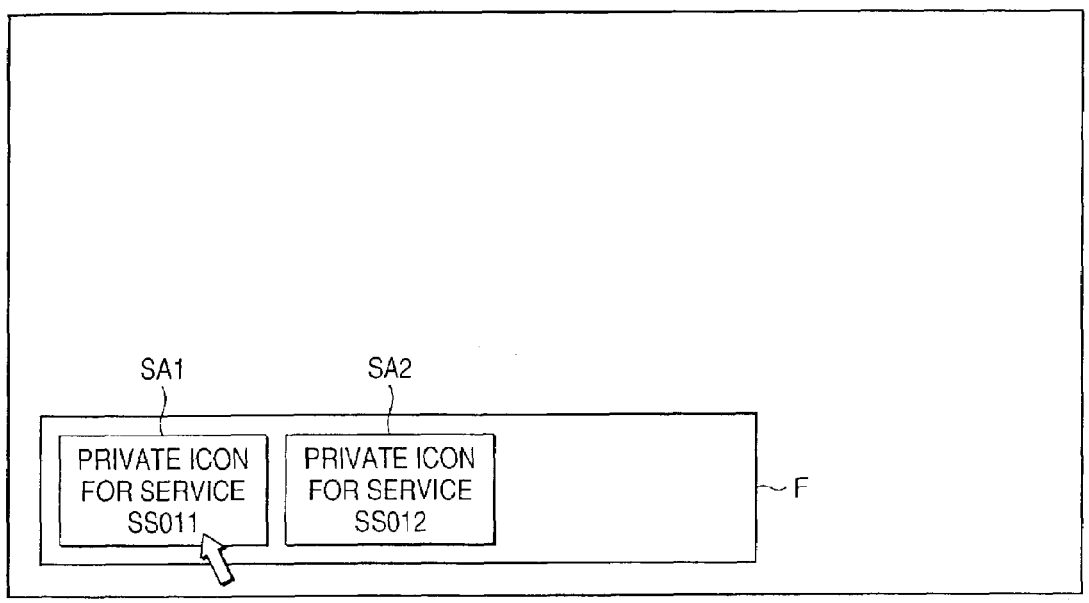
FIG. 15 is a view showing a display example of a private icon.

In step S67, the icon server 14 sends, to the personal computer 11, the authenticated information received from the authentication proxy server 12 in the step S63, ticket issued in the step S64 and the corresponding authentication ID described in the authentication ID list, private-icon SA ID and image data and accompanying data (No. 6 in FIG. 12). The icon control program 53 of the personal computer 11, in step S45, determines whether or not received from the icon server 14 are authenticated information and ticket sent from the icon server 14, the corresponding authentication ID, private-icon SA ID and image data, and accompanying data. In the case of determined received, the process proceeds to step S46 where those are saved (No. 7 in FIG. 12). In step S47, the icon control program 53 controls the display control program 55 to display an image (private icon SA), based on the private-icon SA image data received in the step S45 for example, in the icon folder F displayed in the step S42, as shown in FIG. 15.

If the personal computer 11 (user) in step S82 is determined not an authorized apparatus (authorized user) registered in authentication proxy service of authentication proxy server 12, the step S83, S84 process is skipped over to step S85 where the authorization proxy server 12 sends the information representative of that fact (hereinafter, referred to as authentication NG information) to the icon server 14. The icon server 14, in this case, does not receive an authentication ID list, authenticated information and user ID, making a NO determination in step S63. Proceeding to step S68, the icon server 14 receives the authentication NG information sent from the authentication proxy server 12 and sends it to the personal computer 11.

The personal computer 11 (icon control program 53), in this case, does not receive authenticated information and ticket and the corresponding authentication ID, private-icon SA ID and image data and accompanying data, making a NO determination in step S45. Proceeding to step S48, the personal computer 11 receives the authentication NG information sent from the icon server 14 and controls the display control program 55 to display a message representative of that fact on the display of the output section 27. An effective term can be given to the ticket issued in the step S64 and authenticated information issued in the step S83, in view of security.

Figure 16:
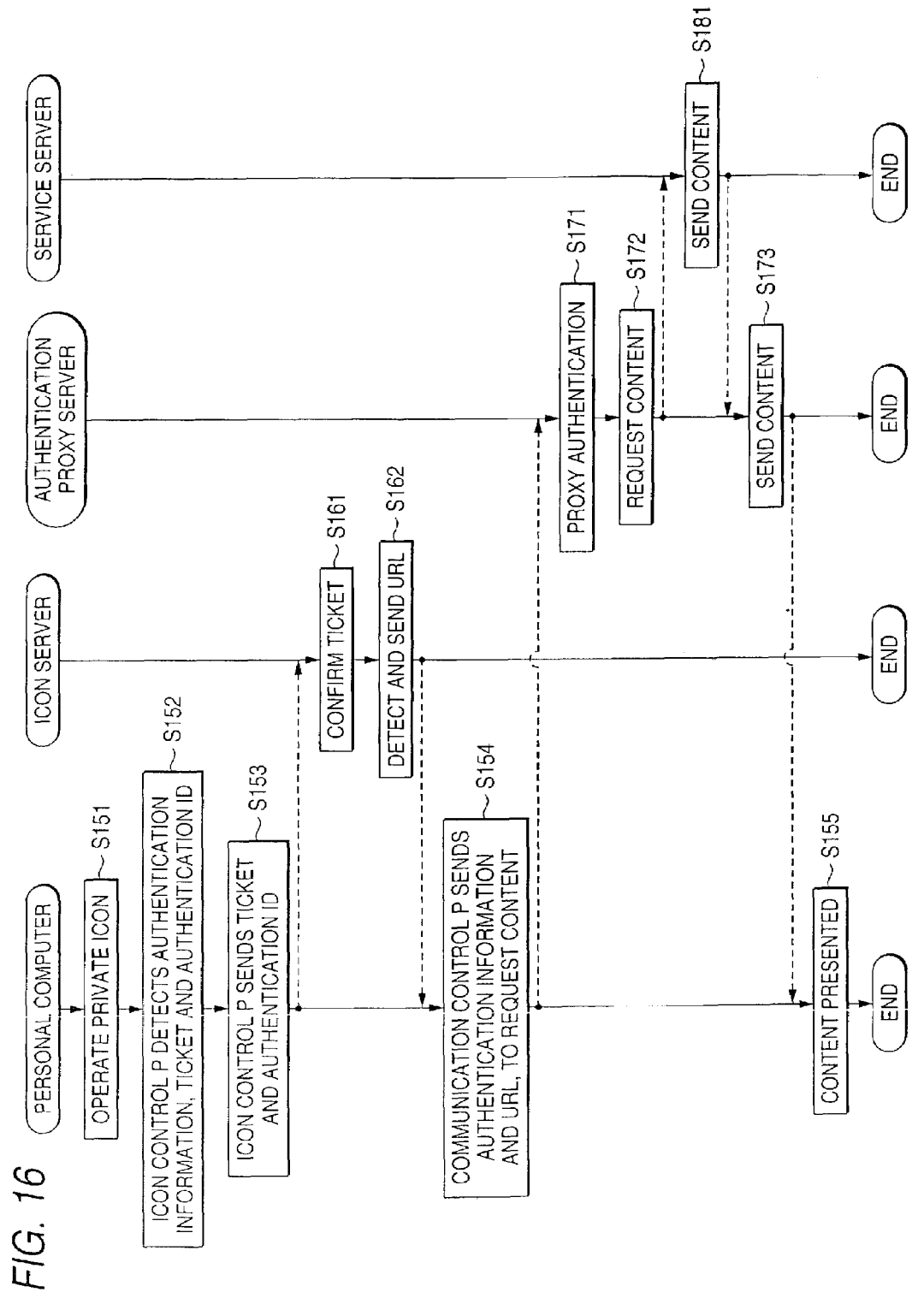
FIG. 16 is a flowchart explaining a process for utilizing an SSO service.
Figure 17:
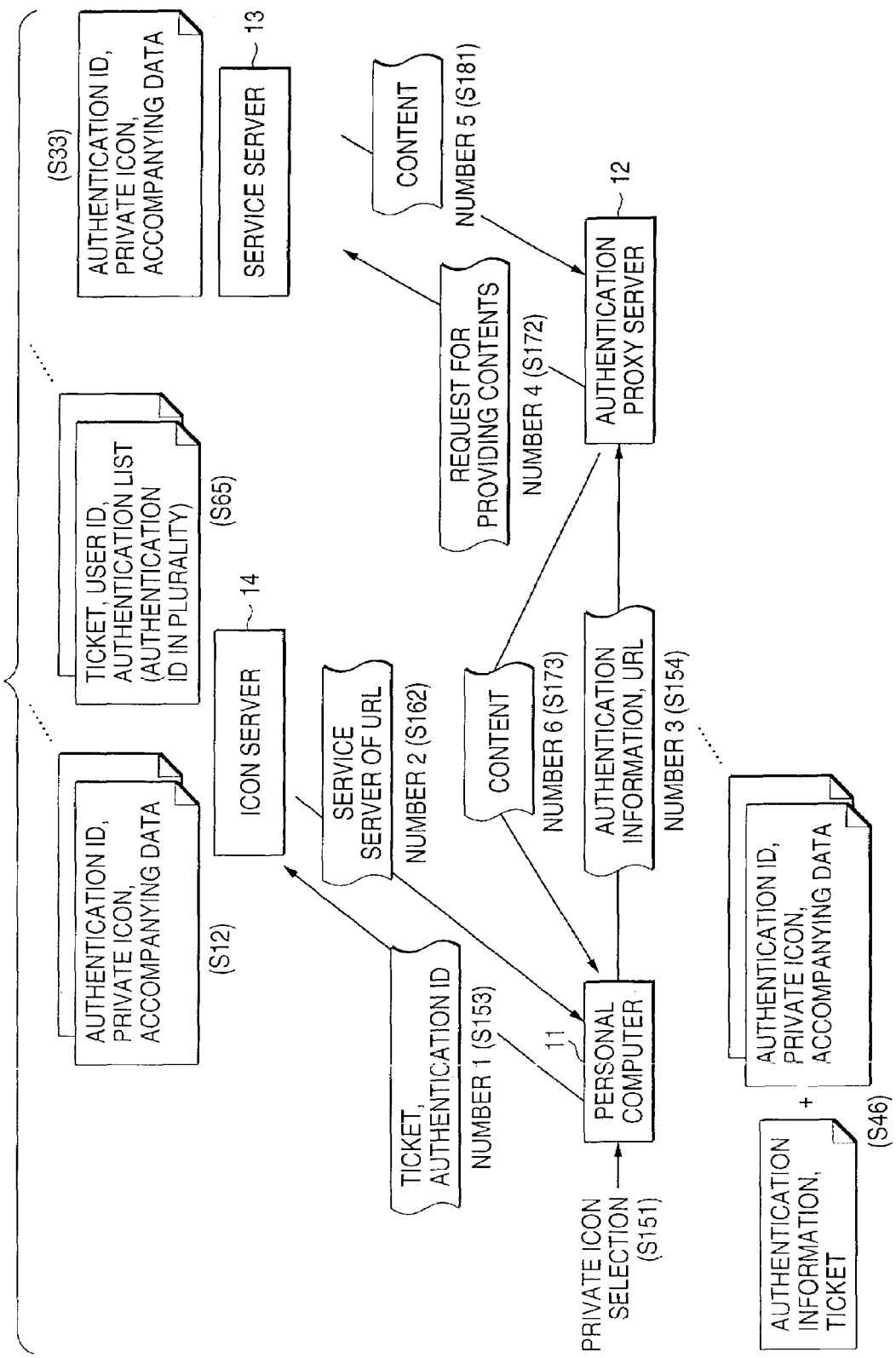
FIG. 17 is a diagram typically showing major pieces of information to be exchanged in the flowchart process of FIG. 16.

Now explanation is made on the procedure for utilizing an SSO service, with reference to a flowchart of FIG. 16. In FIG. 17, there are typically depicted major pieces of information to be exchanged on the flowchart of FIG. 16.

If selecting the private icon SA of an icon folder F displayed on the output section 27 of the personal computer 11 e.g. by clicking or double-clicking in step S151, the icon control program 53 in step S152 detects authenticated information, ticket and authentication ID saved associated with the ID of the private icon SA thereof (step S46 in FIG. 11) (No. 7 in FIG. 12). Incidentally, a private icon SA can be selected by clicking the private icon SA and then selecting "Select" in a displayed menu or by operating a direction key. For example, in case the private icon SA1 for a service SSO 11 shown in FIG. 15 is operated, detected is an authentication ID of the service SSO 11 together with authenticated information and a ticket. Then, in step S153, the icon control program 53 sends the ticket and authentication ID detected in the step S152 to the icon server 14 (No. 1 in FIG. 17).

Receiving the ticket and authentication ID sent from the personal computer 11, the icon server 14 in step S161 confirms the ticket. The icon server 14 in step S162 detects a URL of the service server 13 from the accompanying data being managed associated with the received authentication ID (step S12 in FIG. 9) and sends it to the personal computer 11 (No. 2 in FIG. 17).

Receiving the URL sent from the icon server 14, the icon control program 53 of the personal computer 11 in step S154 delivers the URL and the authenticated information detected in the step S152 to the communication control program 52. The communication control program 52 sends the URL and authenticated information to the authentication proxy server 12 (No. 3 in FIG. 17), making a request for providing a content designated by the URL.

Receiving the request for a content from the personal computer 11, the authentication proxy server 12 in step S171 authenticate the personal computer 11 on the basis of the authenticated information received at that time. Then, the authentication proxy server 12 in step S172 requests the service server 13, which manages the received URL, to provide a requested content (No. 4 in FIG. 17). The service server 13 in step S181 sends the requested content to the authentication proxy server 12 (No. 5 in FIG. 17).

Figure 18:
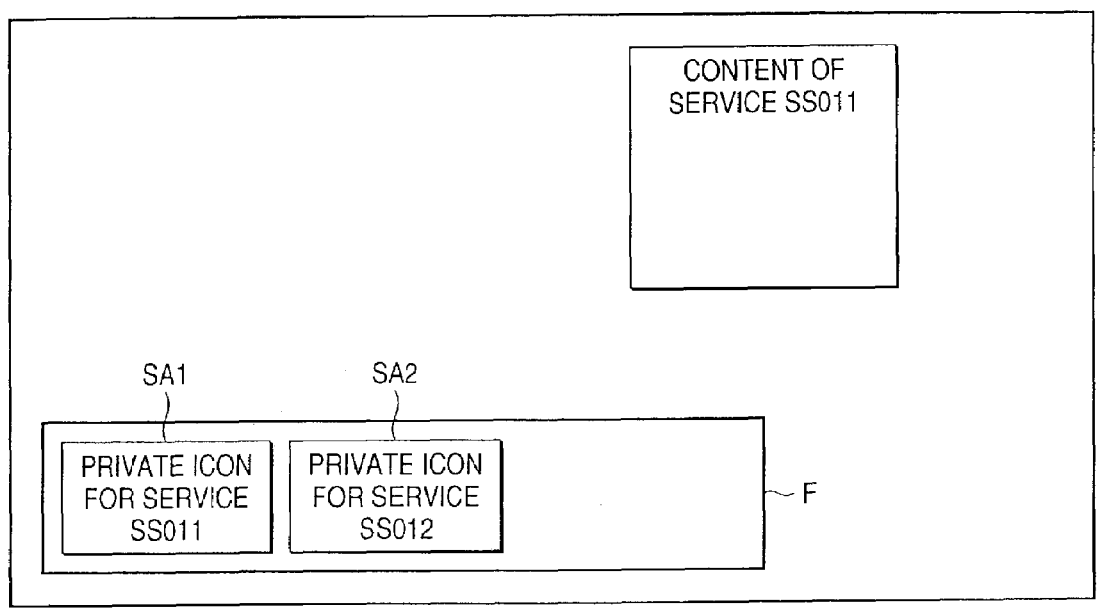
FIG. 18 is a view showing a display example of a content of SSO service.
Figure 19:
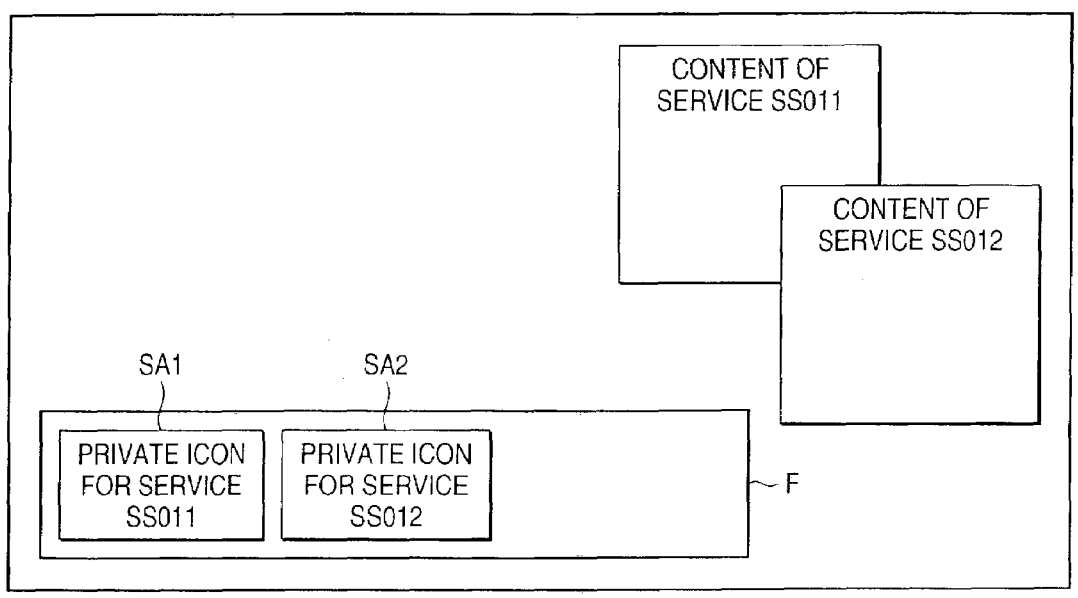
FIG. 19 is a view showing a display example of another content of SSO service.

Receiving the content sent from the service server 13, the authentication proxy server 12 in step S173 sends it to the personal computer 11 (No. 6 in FIG. 17). When the content from the authentication proxy server 12 is received by the communication control program 52 of the personal computer 11, the display control program 55 displays it on the display of the output section 27. For example, when selecting a private icon SA1 for a service SSO 11 displayed in an icon folder F as shown in FIG. 15, a content on the service SSO 11 is displayed as shown in FIG. 18. Meanwhile, in case the private icon SA2 for a service SSO 12 is further selected, a content on the service SSO 12 is further displayed as shown in FIG. 19.

Figure 20:
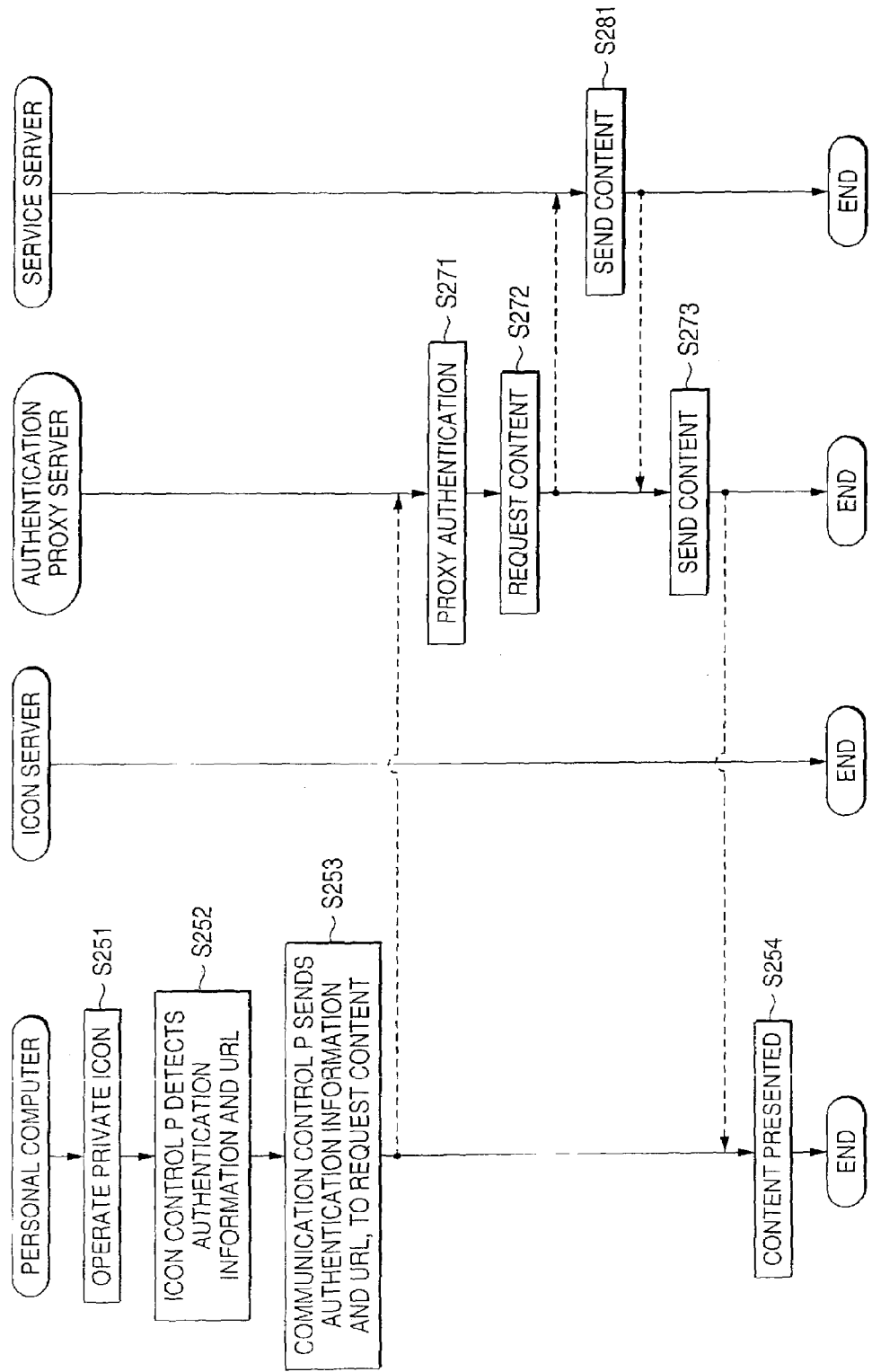
FIG. 20 is a flowchart explaining another process for utilizing an SSO service.
Figure 21:
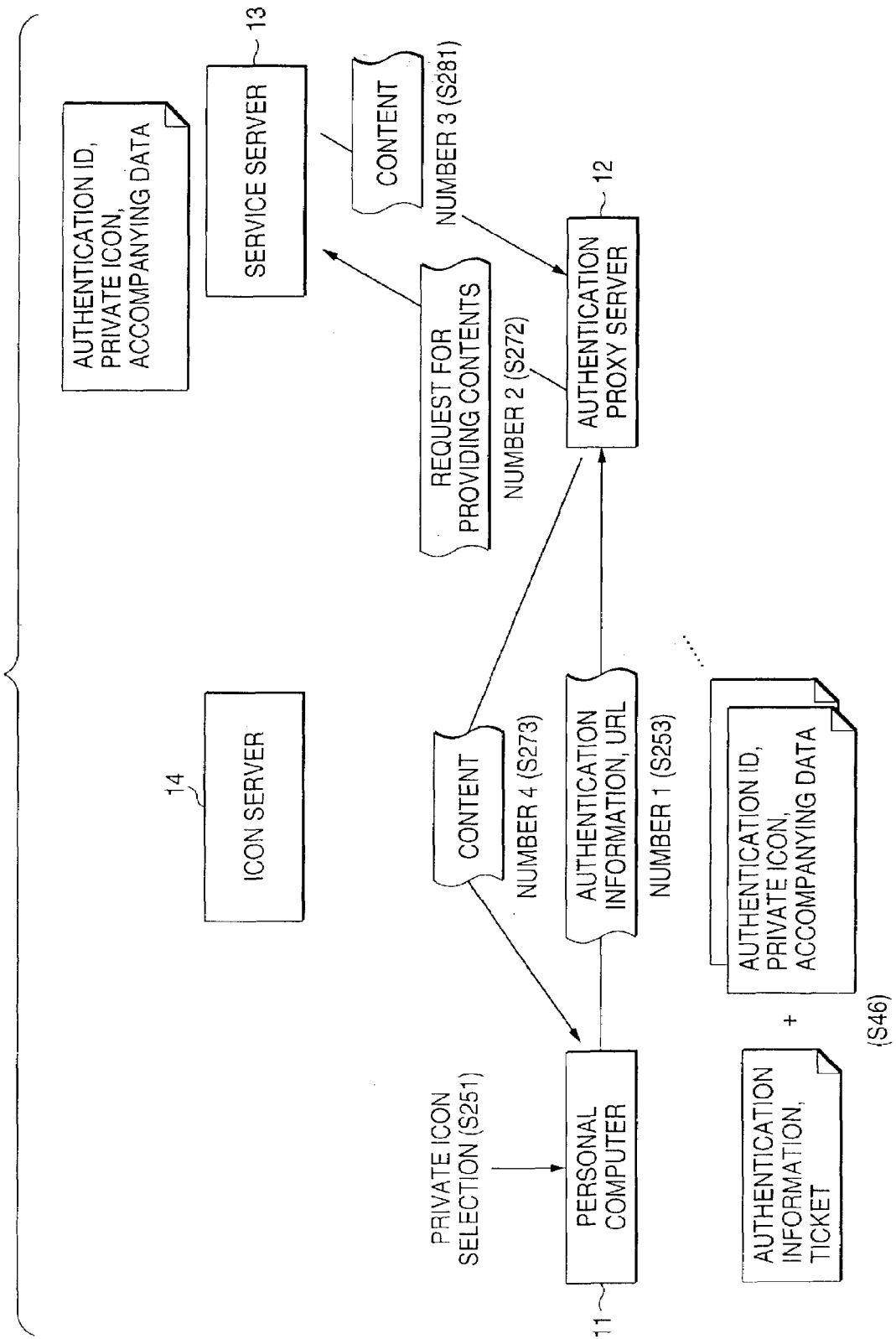
FIG. 21 is a diagram typically showing major pieces of information to be exchanged in the flowchart process of FIG. 20.

Although the above explained the case to utilize SSO service by way of the icon server 14, the configuration can be not through the icon server 14 as shown in a flowchart of FIG. 20. Note that, in FIG. 21, there are typically depicted the major pieces of information to be exchanged according to the flowchart of FIG. 20.

In case selecting a private icon SA of an icon folder F displayed on the output section 27 of the personal computer 11 by clicking or double-clicking in step S251, the icon control program 53 in step S252 detects authenticated information and a URL of the accompanying data saved associated with the ID of the operated private icon SA (step S46 in FIG. 11).

Then, the icon control program 53 of the personal computer 11, in step S253, delivers the authenticated information and URL detected in the step S252 to the communication control program 52. The communication control program 52 sends the URL and authenticated information to the authentication proxy server 12 (No. 1 in FIG. 21), making a request for providing a content designated by the URL.

The process of steps S271 to S273 on the authentication proxy server 12 and steps S281 on the service server 13 is similar to that of steps S171 to S173 or S181 in FIG. 16, hence omitting the explanation thereof. Receiving the content from the authentication proxy server 12 by the communication control program 52 of the personal computer 11 in step S254, the display control program 55 displays it on the display of the output section 27. In this manner, the SSO service to be utilized can be selected by displaying a private icon SA representative of a service content and operating it. The user is allowed to make use of an SSO service in an intuitive way.

Figure 22:
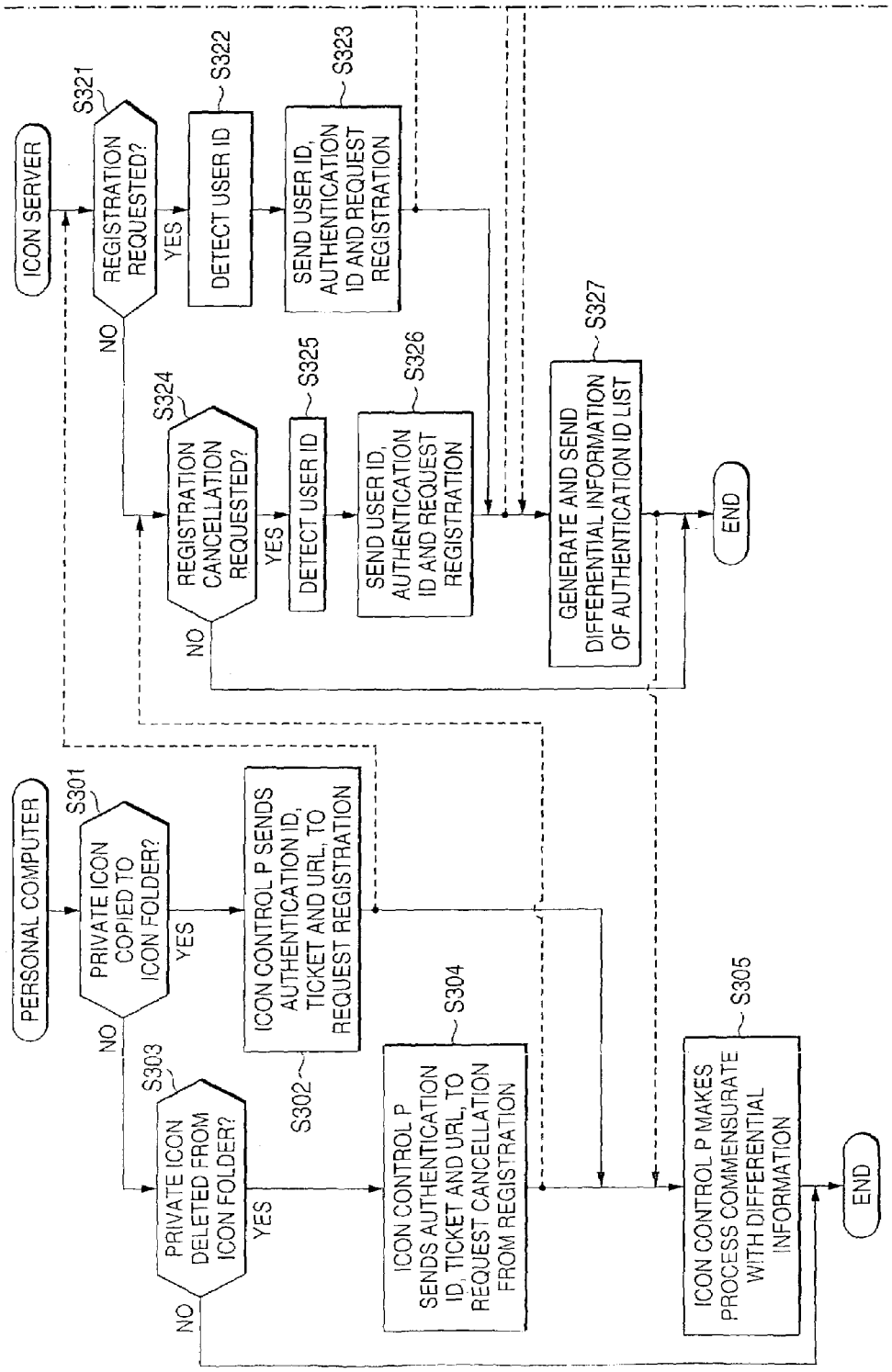
FIG. 22 is a flowchart explaining a process for registration to or cancellation from an SSO service.
Figure 23:
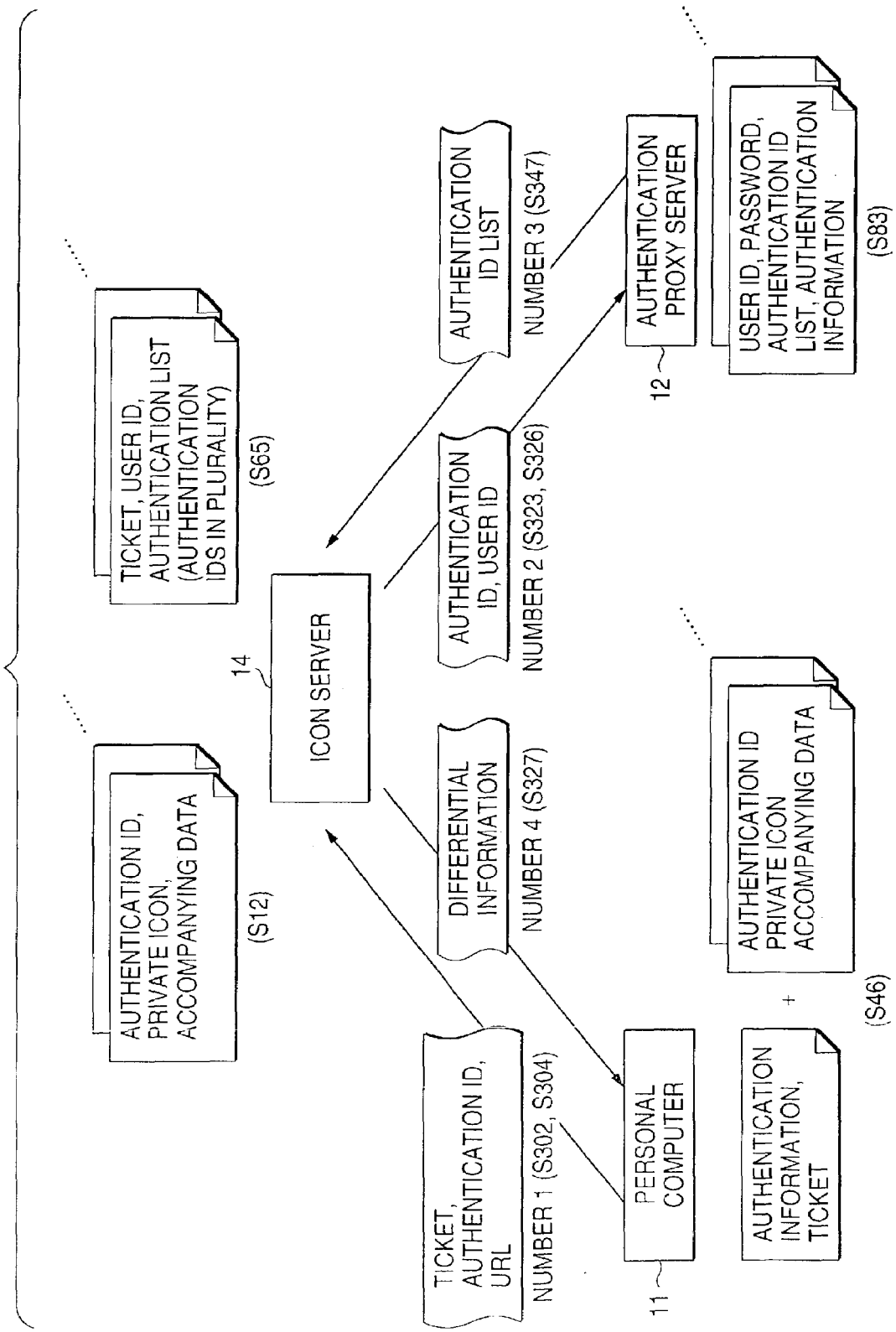
FIG. 23 is a diagram typically showing major pieces of information to be exchanged in the flowchart process of FIG. 22.

Now explanation is made on the procedure to register a subject-of-SSO service as an SSO service to the personal computer 11 and cancel the SSO service from the registration as an SSO service to the personal computer 11, with reference to a flowchart of FIG. 22. FIG. 23 typically shows the major pieces of information to be exchanged in the processes of the flowchart of FIG. 22. Note that, in the personal computer 11, the icon control program 53 makes a control for this process.

First explained is a case to register a subject-of-SSO service as an SSO service to the personal computer 11. In step S301, the icon control program 53 of the personal computer 11 determines whether the private icon SA on a service for registration as an SSO service (subject-of-SSO service) has been copied (e.g. the input part 26 mouse is operated to drag-and-drop the private icon SA to an icon folder F) or not. When determined copied, the process proceeds to step S302.

Figure 24:
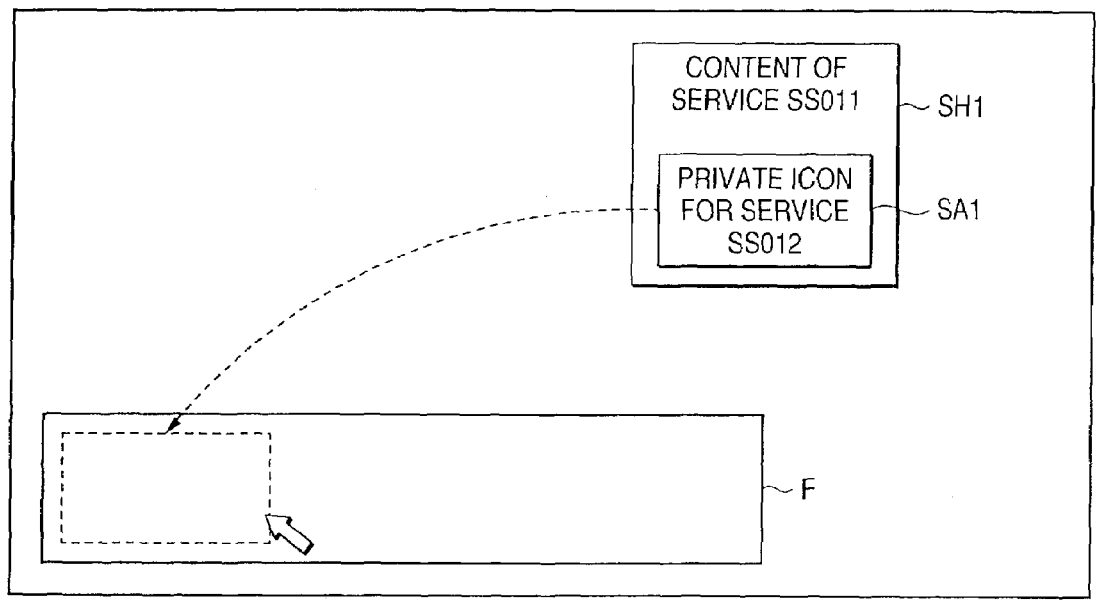
FIG. 24 is a view explaining a process for registration to an SSO service.

For example, there is shown, as in FIG. 24, an homepage SH1 including a private icon SA1 for the service SSO 11 registered as a subject-of-SSO service. When the private icon SA1 is dragged-and-dropped to the private icon SA to an icon folder F, the process proceeds to step S302. Copying the private icon SA to the icon control program 53 can be made by properly selecting "Copy" and "Paste" in the menu displayed upon clicking the private icon SA or by operating a direction key to thereby select a private icon SA.

Figure 25:
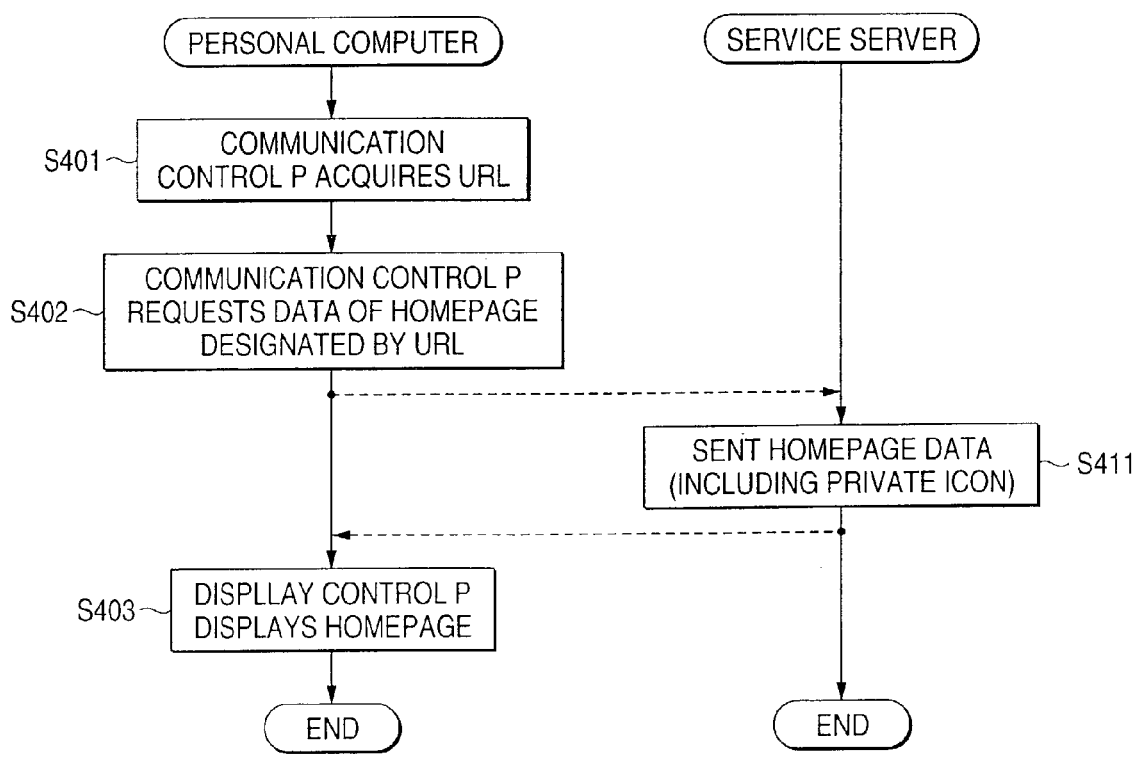
FIG. 25 is a flowchart explaining a process for displaying a private icon.

Now explanation is made on a process to display a homepage SH including a private icon SA, with reference to a flowchart of FIG. 25. In step S401, the communication control program 52 of the personal computer 11 acquires a URL of a subject-of-SSO service. For example, because the user at this time operates the input part 26 and inputs a URL of a subject-of-SSO service, the communication control program 52 acquires the URL from the input part 26.

Then, the communication control program 52 in step S402 accesses a service server 13 corresponding to the acquired URL, to make a request for the data of a homepage designated by the URL. The service server 13 in step S411 sends the data of a homepage SH designated by the requested URL (including the image data of a private icon SA) to the personal computer 11.

Receiving the data from the service server 13 according to the communication control program 52 of the personal computer 11, the display control program 55 in step S403 displays the image corresponding to the received data (homepage SH including a private icon SA) on the display of the output section 27. In this manner, on the output section 27 of the personal computer 11, displayed is a homepage SH1 of service SSO 11 including a private icon SA1 as shown in FIG. 24.

Referring back to FIG. 22, the icon control program 53 of the personal computer 11 in step S302 acquires an authentication ID associated with the private icon SA copied in the step S301, and sends to the icon server 14 (No. 1 in FIG. 23) the authentication ID, ticket saved upon logging in the authentication proxy service (step S46 in FIG. 11) and URL of the authentication proxy server 12. Thus, the subject-of-SSO service copied in the step S301 (service SSO 11 in FIG. 24 example) is requested for registration as an SSO service to the personal computer 11.

The icon server 14 in step S321 determines whether there is a request for registering the SSO service or not. When determined requested, the process proceeds to step S322 where a user ID is detected based on the ticket received at this time from the personal computer 11.

Then, in step S323, the icon server 14 sends the authentication ID received in step S321 and the user ID detected in the step S322 to the authentication proxy server 12 (No. 2 in FIG. 23). Thus, the service specified by the authentication ID (service SSO 11) is requested for registration as an SSO service to the personal computer 11.

The authentication proxy server 12 in step S341 determines whether there is a request for registering the SSO service or not. When determined requested, the process proceeds to step S342 where detected is an authentication ID list, being managed associated with the user ID received at this time from the icon server 14.

Then, the authentication proxy server 12 in step S343 adds the authentication ID received in the step S341 to the authentication ID list detected in the step S342. Thereafter, the authentication proxy server 12 proceeds to step S347 where it sends the authentication ID list newly added with the authentication ID to the icon server 14 (No. 3 in FIG. 23).

Proceeding to step S327 after the process of the step S323 and receiving the authentication ID list sent from the authentication proxy server 12, the icon server 14 detects a difference between that authentication ID list and the authentication ID list saved associated with the user ID detected in the step S322 (step S65 in FIG. 11), and sends the difference information based on the difference to the personal computer 11 (No. 4 in FIG. 23).

For example, in the case the difference between the authentication ID list received from the authentication proxy server 12 in the step S327 and the authentication ID list saved by the icon server 14 represents that an authentication ID of a service SSO 11 (FIG. 24) is newly added to the authentication ID list, the icon server 14 sends, as difference information, the authentication ID for the service SSO 11, private-icon SA1 ID and image data saved associated therewith, and accompanying data (e.g. URL of the service SSO 11) (step S12 in FIG. 9) to the personal computer 11.

Figure 26:
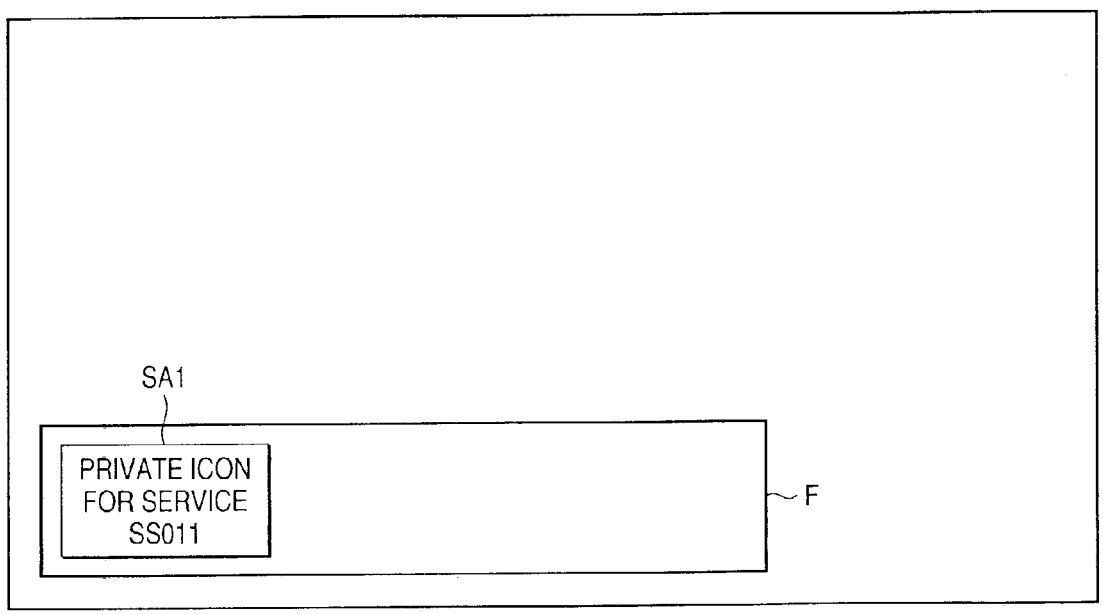
FIG. 26 is a view showing another display example of a private icon.

The icon control program 53 of the personal computer 11, after the process of step S302, proceeds to step S305 where it carries out an operation based on the difference information from the icon server 14. For example, in the case of sending, as difference information, an authentication ID, private-icon SA1 ID and image data and accompanying data, the icon control program 53 saves them by association with the authenticated information and ticket saved in the step S46 in FIG. 11 and controls the display control program 55 to display an image based on the image data of the private icon SA1 (private icon SA1) in an icon folder F as shown in FIG. 26. As in the above manner, the subject-of-SSO service is registered as an SSO service to the personal computer 11.

Now explanation is made on a process to cancel the SSO service from the registration as an SSO service to the personal computer 11. At this time, when it is determined in step S301 that the private icon SA is not copied in the icon folder F, the process proceeds to step S303.

In the step S303, the icon control program 53 of the personal computer 11 determines whether the private icon SA displayed in the icon folder F has been deleted (e.g. the input section 26 mouse is operated and the private icon SA displayed in the icon folder F is dragged and dropped to the outside). When determined deleted, the process proceeds to step S304.

Figure 27:
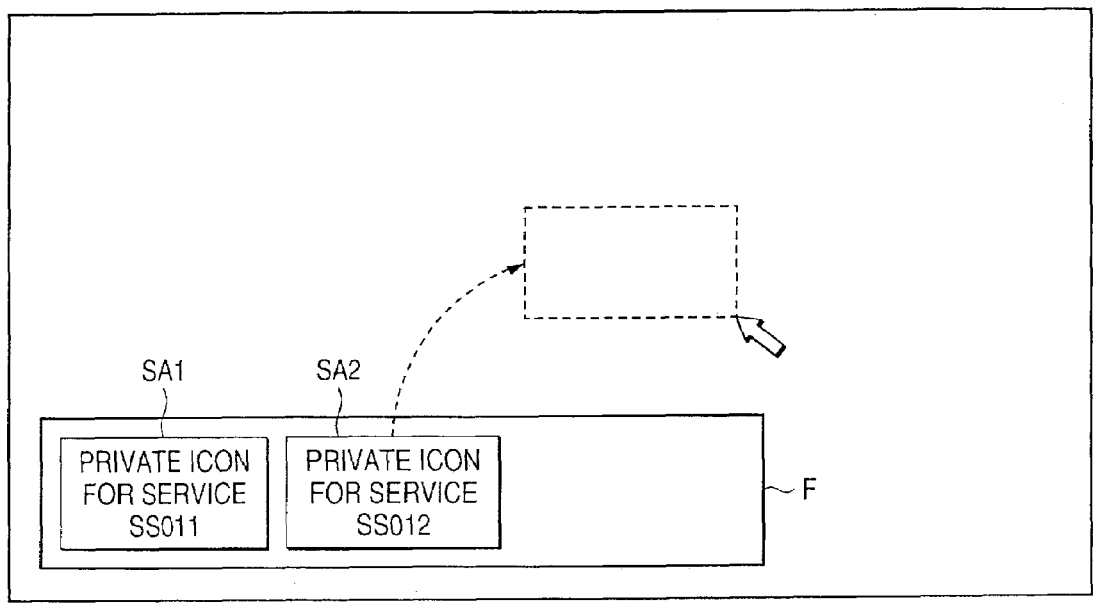
FIG. 27 is a view showing another display example of a private icon.

For example, as shown in FIG. 27, in a state the private icons SA1, SA2 respectively for services SSO 11, SSO 12 are displayed in an icon folder F (i.e. in a state the services SSO 11, SSO 12 are registered as SSO services for the personal computer 11), when the private icon SA2 for service SSO 12 is dragged and dropped outside the icon folder F, the process proceeds to step S304. Deleting the private icon SA from the icon control program 53 can be made by selecting "Delete" in a manu displayed upon clicking the private icon SA or by operating the direction key to select and delete the private icon SA.

In step S304, the icon control program 53 of the personal computer 11 sends, to the icon server 14 (No. 1 in FIG. 23), the authentication ID saved associated with the ID of the private icon deleted in the step S303 (S46 in FIG. 11), the ticket and the URL of the authentication proxy server 12, thereby requesting a registration cancellation of the SSO service deleted in the step S303 (service SSO 12 in the FIG. 27 example) as an SSO service to the personal computer 1. The icon server 14 in this case determines that SSO service registration has not been requested in step S321, hence proceeding to step S324.

In the step S324, the icon server 14 determines whether there is a request for registration cancellation as an SSO service to the personal computer 11 or not. In the case determined requested, the process proceeds to step 325 where detected is a user ID on the basis of the received ticket from the personal computer 11. Then, in step S326, the icon server 14 sends the authentication ID received in the step S324 and the user ID detected in the step S325 to the authentication proxy server 12 (No. 2 in FIG. 23), thereby requesting a registration cancellation of the service (service SSO 12) specified by the authentication ID as an SSO service to the personal computer 11. The authentication proxy server 12, in this case, determines that there is no request for registering an SSO service in step S341, hence proceeding to step S344.

In the step S344, the authentication proxy server 12 determines whether there is a request for registration cancellation as an SSO service to the personal computer 11 or not. When determined requested, the process proceeds to step S345 where detected is an authentication ID list managed associated with the user ID from the icon server 14 received at this time.

Then, the authentication proxy server 12, in step S346, deletes the authentication ID received in the step S344 from the authentication ID list detected in the step S345 and, in step S347, sends it to the icon server 14 (No. 3 in FIG. 23). (The icon server 14 is sent by an authentication ID list deleted of an authentication ID for an SSO service requested for registration cancellation as an SSO service to the personal computer 11).

Receiving the authentication ID list sent from the authentication proxy server 12 in step S327, the icon server 14 detects a differential between that authentication ID list and the authentication ID list saved associated with the user ID detected in the step S325, and sends the differential information commensurate with the differential to the personal computer 11 (No. 4 in FIG. 23).

For example, when the differential between the authentication ID list from the authentication proxy server received in the step S327 and the authentication ID list saved by the icon server 14 represents a deletion of the authentication ID of service SSO 12 (FIG. 27), the icon server 14 sends that fact as differential information to the personal computer 11.

Receiving as differential information the fact the authentication ID for service SSO 12 is deleted from the authentication ID list, the icon control program 53 of the personal computer 11 in step S305 deletes the saved authentication ID for service SSO 12, private-icon SA2 ID and image data, and accompanying data and controls the display control program 55 to delete the private icon SA2 for service SSO 12 from the icon folder F as shown in FIG. 26.

As described above, carried out is registration cancellation as SSO service to the personal computer 11. When the private icon SA is determined undeleted in sep S303 or a process is made in accordance with differential information in step S305, the personal computer 11 ends the process.

When it is determined in step S324 that no request is made for canceling from registration or when differential information is sent to the personal computer 11 in step S327, the icon server 14 ends the process. When it is determined in step S344 that no request is made for canceling from registration or when authentication ID list is sent to the icon server 14 in step S347, the authentication proxy server 14 ends the process.

The foregoing series of processes, although can be executed by hardware, can be implemented on software. In the case of executing the series of processes on software, a program configuring the software is installed from a program storage medium onto a computer incorporated in the exclusive hardware, general-purpose personal computer that various functions are to be executed by installing various programs, and the like.

The storage medium can be structured not only by a package media, to be distributed for providing a program to the user separately from the computer, such as a magnetic disk 41 (including a floppy disk), optical disk 42 (including CD-ROM (Compact Disk-Read Only Memory) and DVD (Digital Versatile Disk)), magnetooptical disk 43 (including MD (Mini-Disk)) or memory card 44 but also by a ROM 22 storing a program to be offered in a state previously incorporated in the computer to the user or a hard disk included in the storage section 28.

It is noted that, in the description, the steps describing the program provided by a medium includes not only, of course, the process to be chronologically executed in a described order but also the process to be executed concurrently or discretely not limitedly to the chronological processing.

In the description, the system represents the overall configured by a plurality of apparatuses. According to the present invention, it is possible to enjoy a service by an intuitive operation through a network.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. In a service providing system having an authentication managing apparatus for making an authentication, required for a terminal unit to receive a service, in proxy for an information providing apparatus to provide the service, and an image managing apparatus for managing an image representative of the service, The authentication managing apparatus comprising:
  first storing means for storing service identifying information of the service associated with user identifying information of a user on the terminal unit;
  determining means for determining whether the terminal unit is to be authenticated or not, in proxy for the information providing and for determining if the information providing apparatus is to be registered or not;
  first detecting means for detecting the service identifying information stored associated with the user identifying information from the first storing means when the determining means determines that the terminal unit is to be authenticated, in proxy for the information providing apparatus;
  first sending means for sending the service identifying information detected by the first detecting means to the image managing means associated with image information representative of the service and for sending an authentication ID to the information providing apparatus;
  authenticating means for authenticating the terminal unit when providing the service is requested from the terminal unit; and
  executing means for executing a predetermined process to provide the service to the terminal unit depending upon an authentication result by the authentication means;

the image managing apparatus comprising:
  second storing means for storing service identifying information of the service and image information representative of the service to be identified by the service identifying information, the image information comprising an image icon;
  writing means for generating a private icon by writing the image icon with the service identifying information;
  second detecting means for detecting the image information representative of the service to be identified by the service identifying information from the second storing means when the service identifying information is sent by the first sending means of the authentication managing apparatus; and
  second sending means for sending the image information and the private-icon detected by the second detecting means to the terminal unit; and the terminal unit comprising:
  third storing means for storing the image information sent by the second sending means of the image managing apparatus;
  display control means for displaying an private icon stored in the third storing means;
  operating means for operating the private icon displayed by the display control means;
  request means for requesting to provide the service corresponding to the private icon operated by the operating means; and
  second receiving means for receiving the service provided due to the process by the executing means of the authentication managing apparatus.

2. A service providing system according to claim 1, wherein the second storing means of the image managing apparatus stores the service identifying information, the image information representative of the service to be identified by the service identifying information, and accompanying information representative of a managing destination of the service to be identified by the service identifying information;
  the second detecting means, when the service identifying information is sent by the first sending means of the authentication managing apparatus, detects from the second storing means the image information representative of the service to be identified by the service identifying information and the accompanying information representative of a managing destination of the service;
  the second sending means sends the image information and accompanying information detected by the second detecting means to the terminal unit;
  the third storing means of the terminal unit stores, with association, the image information and accompanying information sent by the second sending means of the image managing apparatus;
  the request means detects, from the third storing means, the accompanying information stored associated with the image information representative of the service corresponding to the private icon operated by the operating means, and sends the detected accompanying information to the authentication managing apparatus thereby requesting to provide the service; and
  the executing means of the authentication managing apparatus acquires the service being managed in a managing destination shown by the accompanying information sent from the requesting means of the terminal unit depending upon an authentication result by the authenticating means, and executes the process for provision to the terminal unit.

3. A service providing system according to claim 2, wherein the accompanying information is a URL of the service under management of the information providing apparatus.

4. A service providing system according to claim 1, wherein the third storage means of the terminal unit stores, with association, the image information sent by the second sending means of the image managing apparatus and accompanying information representative of a managing destination of the service the image information corresponds to;

the request means detects from the third storage means the accompanying information stored associated with the image information representative of the service corresponding to the image icon operated by the operating means, and sends the accompanying information thus detected to the authentication managing apparatus thereby requesting to provide the service; and the executing means of the authentication managing means acquires from the information providing apparatus the service under management at a managing destination represented by the accompanying information sent from the request means of the terminal unit depending upon an authentication result by the authenticating means, and executes the process for provision to the terminal unit.

5. A service providing system according to claim 4, wherein the accompanying information is a URL of the service under management of the information providing apparatus.

6. A service providing system according to claim 1, wherein the determining means of the authentication managing apparatus determines whether the terminal unit is to be authenticated or not, in proxy for the information providing apparatus, while, when determining that the terminal unit is to be authenticated in proxy for the information providing apparatus, issuing authenticated information representative of that fact;

the first sending means sends the service identifying information detected by the first detecting means and the authenticated information issued by the determining means to the image managing apparatus;

the authenticating means authenticates the terminal unit on the basis of the authenticated information sent from the terminal unit;

the second sending means of the image managing apparatus sends the image information detected by the second detecting means and the authenticated information sent by the first sending means of the authentication managing apparatus to the terminal unit;

the third storing means of the terminal unit stores the image information and authenticated information sent by the second sending means of the image managing apparatus; and the request means sends the authenticated information to the authentication managing apparatus, to request for providing the service corresponding to the image icon operated by the operating means.

* * * * *